United States Patent
Tokunaga

(10) Patent No.: US 9,672,391 B2
(45) Date of Patent: Jun. 6, 2017

(54) INFORMATION MEDIUM READING APPARATUS AND METHOD FOR READING INFORMATION MEDIUM

(71) Applicant: NIDEC SANKYO CORPORATION, Suwa-gun, Nagano (JP)

(72) Inventor: Takato Tokunaga, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/439,048

(22) PCT Filed: Aug. 27, 2014

(86) PCT No.: PCT/JP2014/072350
§ 371 (c)(1),
(2) Date: Apr. 28, 2015

(87) PCT Pub. No.: WO2015/030022
PCT Pub. Date: Mar. 5, 2015

(65) Prior Publication Data
US 2016/0239690 A1 Aug. 18, 2016

(30) Foreign Application Priority Data
Aug. 30, 2013 (JP) .................................. 2013-180126

(51) Int. Cl.
G06K 17/00 (2006.01)
G06K 7/08 (2006.01)
(Continued)

(52) U.S. Cl.
CPC ............. *G06K 7/084* (2013.01); *G06K 9/186* (2013.01); *G11B 5/00808* (2013.01)

(58) Field of Classification Search
CPC .... G06Q 30/02; G07F 7/1008; G06K 7/0004; G06K 7/087; G06K 7/084; G06K 7/10722; G06K 7/14
(Continued)

(56) References Cited

U.S. PATENT DOCUMENTS 6,249,615 B1 * 6/2001 Kunishige ............... H04N 1/401
358/461

FOREIGN PATENT DOCUMENTS

JP 10233990 A 9/1998
JP 2001291057 A 10/2001
(Continued)

OTHER PUBLICATIONS

International Search Report corresponding to Application No. PCT/JP2014/072350; Date of Mailing: Oct. 28, 2014, with English translation.

*Primary Examiner* — Karl D Frech
(74) *Attorney, Agent, or Firm* — Cantor Colburn LLP

(57) ABSTRACT

An information medium reading device may include a magnetic head to read magnetic datum and output an analog magnetic signal; an image sensor to take a photo of image datum and output an analog image signal; an analog switch unit to select one of the analog magnetic signal and the analog image signal and output the selected one; an analog front-end unit having an analog/digital (A/D) conversion function for converting an analog signal to a digital signal, while using a voltage according to a black reference voltage at the time of image reading, as a bottom voltage, within a predetermined converted voltage range; a level adjustment unit to make a level adjustment; and a timing control unit. The analog magnetic signal may be input into the analog front-end unit, and an A/D conversion may be carried out for converting an analog signal to a digital signal.

5 Claims, 16 Drawing Sheets

(51) Int. Cl.
*G06K 9/18* (2006.01)
*G11B 5/008* (2006.01)

(58) Field of Classification Search
USPC .............................. 235/375, 440, 449, 454
See application file for complete search history.

(56) References Cited

FOREIGN PATENT DOCUMENTS

| | | | |
|---|---|---|---|
| JP | 2002109599 | A | 4/2002 |
| JP | 2007133662 | A | 5/2007 |
| JP | 2007323489 | A | 12/2007 |
| JP | 2010134579 | A | 6/2010 |

* cited by examiner

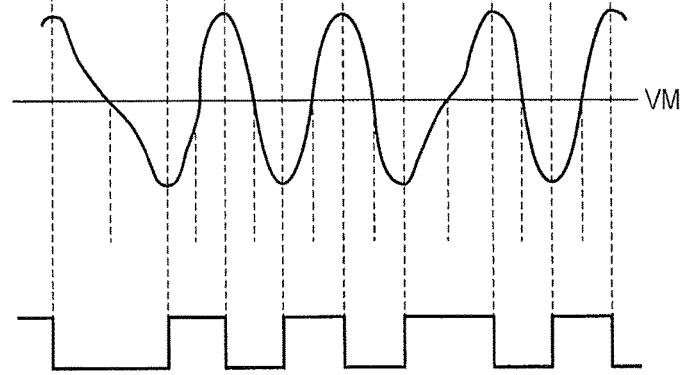
Fig. 2A RECORDED SIGNAL
Fig. 2B S28
Fig. 2C F2F SIGNAL
FIG. 3
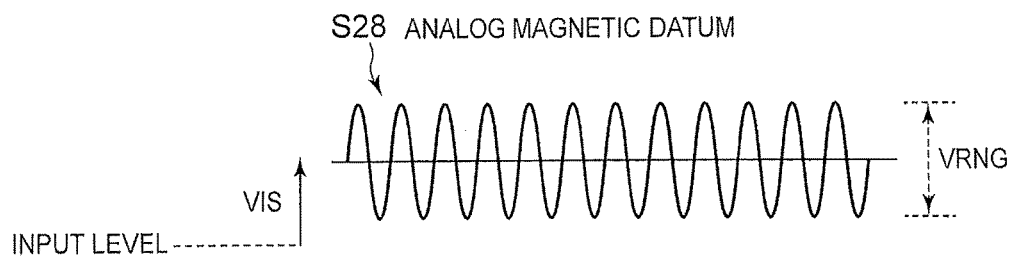

INFORMATION MEDIUM READING APPARATUS AND METHOD FOR READING INFORMATION MEDIUM

CROSS REFERENCE TO RELATED APPLICATIONS

This is the U.S. national stage of application No. PCT/JP2014/072350 filed on Aug. 27, 2014. Priority under 35 U.S.C. §119(a) and 35 U.S.C. §365(b) is claimed from Japanese Application No. 2013-180126, filed Aug. 30, 2013 the disclosures of which are also incorporated herein by reference.

FIELD OF THE INVENTION

The present invention relates to an information medium reading device for reading and processing information recorded in an information medium (i.e., its recording section), and an information medium reading method.

BACKGROUND

Conventionally, there is a card medium as an information medium for conducting personal verification, for example, such as a license, a cash card, a credit card, and a passport. A magnetic stripe, a barcode, a contactless IC chip, and the like are used in such a card medium, in order to record personal information for conducting personal verification.

By way of having a magnetic head contact with and slide on a magnetic stripe, positioned on a surface of an ID card; a card reader reads out magnetic information recorded in the ID card, and otherwise writes new magnetic information into the ID card. Among those card readers, known is a card reader that reads and processes information recorded in a magnetic stripe formed in a card medium (i.e., its recording section). The card reader reads out magnetic information recorded in the card by way of having a magnetic head contact with and slide on a magnetic stripe formed on the card.

Then, in the card medium described above, personal information is recorded in some cases, on a front side surface and the like of the card medium, by using a photograph of a face, an image of a fingerprint or a signature, and the like. Information medium reading devices of this kind include a device, for example, equipped with a structure of a card scanner as a main part; and in its card transfer section, an image sensor such as a line sensor and the like is placed for taking a photo of image data on a front side surface and a rear side surface of the card medium, and for reading out the image data; and furthermore the above-described magnetic head for reading out a magnetic datum is placed (for example, refer to Patent Document 1 and Patent Document 2).

PATENT DOCUMENTS

Patent Document 1: Japanese Unexamined Patent Application Publication No. 2001-291057
Patent Document 2: Japanese Unexamined Patent Application Publication No. 2007-323489

In such an information medium reading device, a subordinate board is separately provided, in addition to a main board in which an image datum reading system (an image datum processing system) is formed in order to carry out signal processing with respect to an image datum to be read out by an image sensor; wherein a magnetic datum reading system (a magnetic datum processing system) is formed in the subordinate board in order to carry out signal processing with respect to a magnetic datum to be read out by a magnetic head. As a result, required are the subordinate circuit board, in which the magnetic signal reading system (the magnetic signal processing system) is formed, as well as a peripheral circuit component; so that the main circuit board and the subordinate circuit board are separately required, and therefore a disadvantage exists because of an enlarged circuit scale leading to an enlarged unit.

SUMMARY

Then, at least an embodiment of the present invention provides an information medium reading device and an information medium reading method with which both operations of reading an image datum and reading a magnetic datum can be conducted, and it becomes possible to avoid enlargement of a circuit scale and enlargement of a unit.

An information medium reading device according to at least an embodiment of the present invention includes: a magnetic head for reading a magnetic datum recorded in an information medium, and outputting an analog magnetic signal; an image sensor for taking a photo of an image datum positioned on a surface of the information medium, and outputting an analog image signal; an analog switch unit for selecting one of the analog magnetic signal and the analog image signal according to a mode signal of a signal-reading mode, and outputting the selected one; an analog front-end unit having an analog/digital (A/D) conversion function for converting an analog signal to a digital signal, while using a voltage according to a black reference voltage at the time of image reading, as a bottom voltage, within a predetermined converted voltage range; a level adjustment unit for making a level adjustment by way of adding a bias voltage, corresponding to a center value of the predetermined converted voltage range, with respect to a voltage level of the analog magnetic signal; and a timing control unit for creating a timing signal including a clock for a process appropriate to the analog image signal or the analog magnetic signal, according to the mode signal of a signal-reading mode; and controlling operations of at least the analog switch unit, the analog front-end unit, and the level adjustment unit, in accordance with the created timing signal; wherein the analog magnetic signal, for which the level adjustment has been made in the level adjustment unit, is input into the analog front-end unit, and an A/D conversion is carried out for converting an analog signal to a digital signal.

By using the information medium reading device according to at least an embodiment of the present invention, both operations of reading an image datum and reading a magnetic datum can be conducted, and it becomes possible to avoid enlargement of a circuit scale and enlargement of a unit.

In at least an embodiment of the present invention, the image sensor is a line sensor arranged linearly for receiving light from an information medium; and the analog front-end unit includes a line clamping means for clamping the analog signal output from the line sensor, in line cycles. Accordingly, the line clamping means carries out line clamping with respect to an image datum in line cycles; and in comparison with bit clamping for clamping in bit cycles, the line clamping means has a less number of clamping operations, and therefore it is effective for energy saving and improvement in a speed of reading a image datum.

In at least an embodiment of the present invention, the level adjustment unit is positioned between the magnetic head and the analog switch unit. Accordingly, being provided with the analog switch unit installed before the analog front-end unit, it is also possible to increase an entire speed of transferring data by way of converting at high speed with the A/D conversion function while the analog switch unit carries out a switching operation.

In at least an embodiment of the present invention, the timing control unit conducts control in such a way that a sampling frequency for A/D conversion in the analog front-end unit becomes different between the magnetic datum and the image datum. Accordingly, it becomes possible to set a sampling frequency appropriate to a datum as an object of A/D conversion. For example, accuracy of reading a magnetic datum can be improved by way of increasing a sampling frequency.

An information medium reading method including: a magnetic datum reading step for reading a magnetic datum recorded in an information medium with a magnetic head, and outputting an analog magnetic signal; an image datum reading step for taking a photo of an image datum existing on, at least one side of a front side surface and a rear side surface of the information medium, with an image sensor, and outputting an analog image signal; a selection step for selecting one of the magnetic datum read out with the magnetic head, and the image datum read out with the image sensor, by an analog switch unit according to a mode signal, and outputting the selected one; an analog/digital (A/D) conversion step for converting an analog signal to a digital signal, while using a voltage according to a black reference voltage at the time of image reading, as a bottom voltage, within a predetermined converted voltage range; a level adjustment step for making a level adjustment by way of adding a bias voltage, corresponding to a center value of the predetermined converted voltage range, with respect to a voltage level of the analog magnetic signal; and a timing control step for creating a timing signal including a clock for a process appropriate to the image datum or the magnetic datum, according to the mode signal; and controlling operations of at least the selection step, the analog/digital (A/D) conversion step, and the level adjustment step, in accordance with the created timing signal; wherein, with respect to the analog magnetic signal for which the level adjustment has been made in the level adjustment step, an A/D conversion is carried out for converting an analog signal to a digital signal in the analog/digital (A/D) conversion step.

According to at least an embodiment of the present invention, both operations of reading an image datum and reading a magnetic datum can be conducted, and it becomes possible to avoid enlargement of a circuit scale and enlargement of a unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A-2C are diagrams showing waveforms of an example of recorded information of a card medium and an example of a signal read by a magnetic head.

FIG. 3 is a diagram schematically showing a process of adding a bias voltage VIS, corresponding to a center value of a predetermined converted voltage range VRNG, to an input analog magnetic signal in a level adjustment unit according to the present embodiment.

DESCRIPTION OF THE PREFERRED EMBODIMENTS

An embodiment of the present invention is explained below with reference to the accompanying drawings.

An information medium reading device 10 according to the present embodiment is a card scanner in which an image sensor is installed, and furthermore it is equipped with a magnetic head. The information medium reading device 10 is essentially structured with an image processing IC, as an image datum reading system, to be used for digitally processing an analog output from the image sensor; and the information medium reading device 10 shares an analog front-end (AFE) unit, having an analog/digital (A/D) conversion function for converting an analog signal to a digital signal, with a magnetic datum reading system. Then, A/D conversion is carried out with respect to a magnetic datum read by use of the magnetic head, and the magnetic datum is read out by way of digital demodulation.

As explained later in detail, the information medium reading device 10 has a characteristic configuration described below: 1) A sampling frequency (sampling rate) of the analog front-end (AFE) unit is switched at the time of reading an image datum and reading a magnetic datum, individually for each operation. 2) When a line sensor is used for reading an image datum, a burst datum for each line is taken in; and in the meantime, for reading a magnetic datum, it is needed to read out continuous magnetic data, and therefore data transfer operation (operation of taking in data) is switched accordingly. 3) A/D conversion is carried out after adding a bias voltage to a magnetic datum so as to properly have the datum within a predetermined converted voltage range at the time of reading the magnetic datum, and therefore an analog front-end (AFE) unit can be shared in common.

Moreover, in the present embodiment, an explanation is made by using a case example in which an F&2F signal, corresponding to a "0"&"1" signal magnetically recorded by way of a frequency modulation method, is read out and reproduced at the time of reading out a magnetic datum. Nevertheless, the present technology is not limited to an F&2F method.

Furthermore, an information medium as an object to be read in the present embodiment is a card medium, and it is called a "card medium" in the following explanation. As a card medium, included are various formats of information media such as a card, a ticket made of paper, a driver license, and the like in which a magnetic stripe is formed, wherein those information media can be transferred through a transfer path by a transfer unit of the information medium reading device.

(Outline of General Structure of Information Medium (Card Medium) Reading Device)

Figure 1:
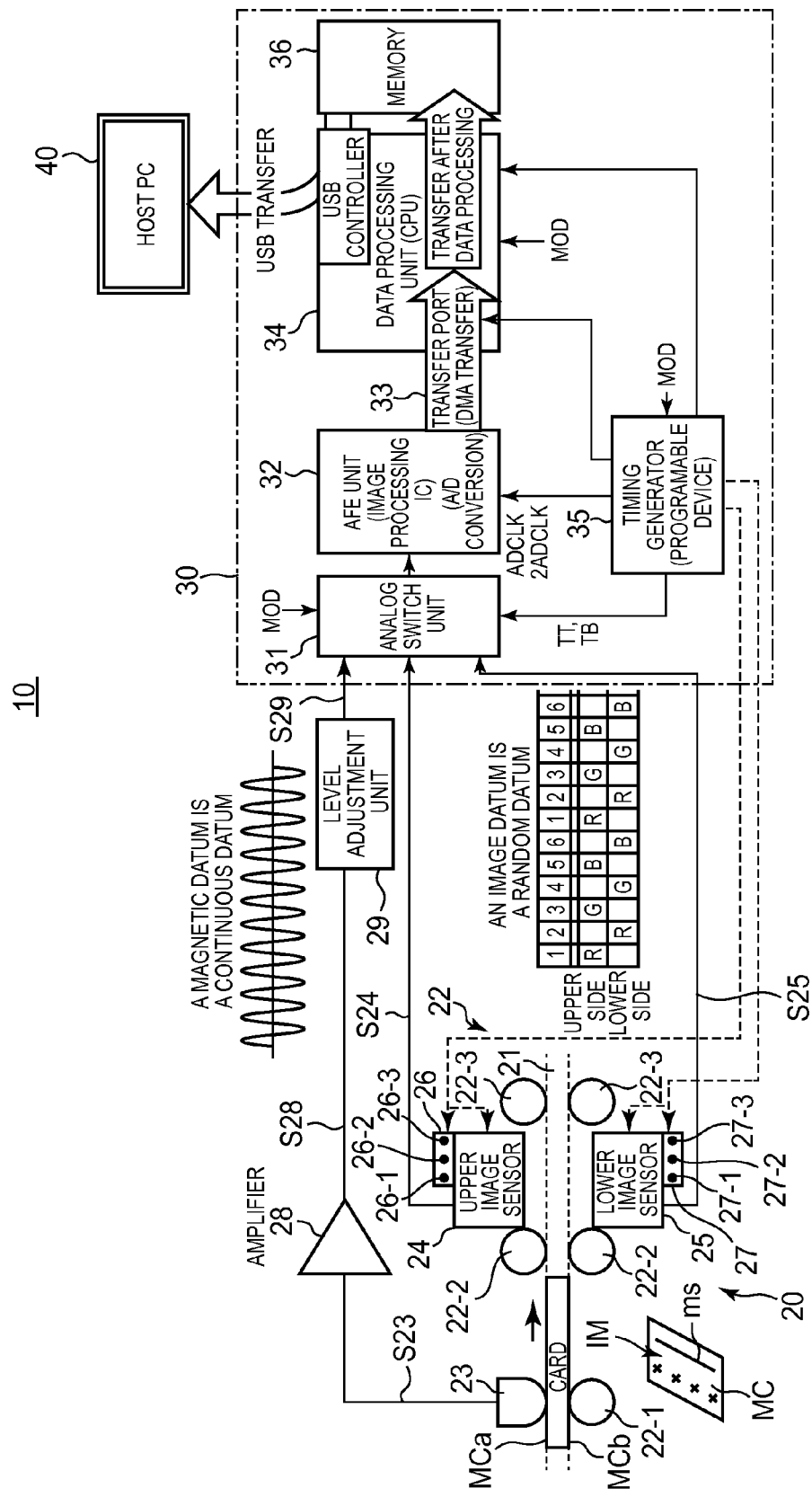
FIG. 1 is a diagram showing an outline of a configuration example of an information medium reading device, which handles a card medium as an information medium, according to an embodiment of the present invention.

FIG. 1 is a diagram showing an outline of a configuration example of an information medium reading device, which handles a card medium as an information medium, according to an embodiment of the present invention. FIGS. 2A-2C are diagrams showing waveforms of an example of recorded information of a card medium and an example of a signal read by a magnetic head. FIG. 2A, FIG. 2B, and FIG. 2C show a magnetic datum recorded in a card medium, an analog magnetic signal read out by the magnetic head and amplified, and an F2F signal to be read out and demodulated, respectively.

As shown in FIG. 1, the information medium reading device 10 according to the present embodiment includes a card handling unit 20 and a reading process unit 30. Moreover, in FIG. 1, the reading process unit 30 is connected to a host device (a higher level device) 40 by way of a communication line, and so configured as to execute a process according to a command from the host device 40 and to transfer a datum after the process to the host device 40. In order to establish communications between the host device 40 and the information medium reading device (a lower level device), it is possible to adopt various kinds of communication methods, such as an RS232C method, a parallel port method, a USB (Universal Serial Bus) connection method, and the like. In an example shown in FIG. 1, a USB method is adopted.

The card handling unit 20 includes a card transfer path 21, and a card transfer unit 22 for transferring a card medium MC along the card transfer path 21 by using transfer rollers 22-1 through 22-3 and the like, driven by a drive motor that is not illustrated. Along the card transfer path 21 in the card handling unit 20, there are placed a magnetic head 23 for reading a magnetic datum of a magnetic stripe ms of the card medium MC, and a first image sensor (an upper image sensor) 24 as well as a second image sensor (a lower image sensor) 25; wherein the image sensors are line sensors and the like, for taking a photo of and reading out an image datum IM on a front side surface (top surface) and a rear side surface (bottom surface) of the card medium MC.

In the present embodiment, the first image sensor 24 and the second image sensor 25 are each configured with, for example, a line sensor. An imaging element of the image sensors is, for example, formed with a CCD or a CMOS sensor. The first image sensor 24 and the second image sensor 25 are line sensors that take a photo of and read out the image datum IM on the front side surface (top surface) and the rear side surface (bottom surface) of the card medium MC; and in each of the line sensors, pixels are linearly placed (one-dimensionally arrayed) in a main scanning direction. In other words, each of the line sensors is a photoelectric conversion element having a function of outputting a voltage corresponding to the amount of incident light, as an analog image signal. Moreover, each of the first image sensor 24 and the second image sensor 25 reads an image from the card medium MC, and inputs an output signal that is output from each channel (ch1, ch2, and ch3 in the present embodiment); i.e., an output signal coming from each of channels constituting the image sensors 24 and 25, into an analog switch unit 32. Thus, each of the image sensors 24 and 25 has a plurality of separated channels (areas), each of which is a group of an arbitrary number of pixels placed linearly; and an analog image signal is output from each area.

In an example shown in FIG. 1, the magnetic head 23 is positioned at a card insertion slot side; and in the meantime, the first image sensor 24 and the second image sensor 25 are positioned inside the card handling unit 20 in such a way as to face each other across the card transfer path 21. This arrangement is just an example, and it is also possible to adopt a configuration in which the first image sensor 24 and the second image sensor 25 are positioned at a card insertion slot side, while the magnetic head 23 is positioned at an inner side.

(Light Source Unit)

At installation spots of the first image sensor 24 and the second image sensor 25, a first light source unit 26 and a second light source unit 27 are placed, respectively, for irradiating the card medium MC with illuminating light at the time of reading an image datum. The first light source unit 26 illuminates a front side surface (top surface) of the card medium MC that the first image sensor 24 takes a photo of. The first light source unit 26 is configured, for example, in such a way as to include a normal light source (visible light) 26-1, an infrared ray light source (IR) 26-2, an ultraviolet light source (UV) 26-3, and so on.

The second light source unit 27 illuminates a rear side surface (bottom surface) of the card medium MC that the second image sensor 25 takes a photo of. The second light source unit 27 is configured, for example, in such a way as to include a normal light source (visible light) 27-1, an infrared ray light source (IR) 27-2, an ultraviolet light source (UV) 27-3, and so on.

In the card handling unit 20, an amplifier 28 and a level adjustment unit 29 are placed in a transfer line (transmission line) for a magnetic datum read by the magnetic head 23.

Furthermore, in the card transfer path 21, there are placed a plurality of sensors, not shown, for detecting a presence and a transfer position of the card medium MC, as an object to be transferred; and then, according to a detection result by these sensors, an operation of reading the magnetic datum by the magnetic head 23, and an operation of reading the image datum by the first image sensor 24 and the second image sensor 25 are carried out by the reading process unit 30 or the host device 40. Moreover, with regard to the first light source unit 26 and the second light source unit 27, a light source is suitably selected and operated, for example, under control of the reading process unit 30. Incidentally, a selection of a captured image is set by the host device 40. In this context, the "selection of a captured image" means a selection of a case of image capturing by use of the normal light source (visible light), the infrared ray light source (IR), or the ultraviolet light source (UV) 26-3 with which the first light source unit 26 and the second light source unit 27 are configured. Furthermore, in the present embodiment, if the normal light source (visible light) is used, a selection can also be made among cases of image capturing by use of a (Red)', 'G (Green)', and 'B (Blue)', as shown in FIG. 1.

The magnetic head 23 reads out a magnetic datum S23 recorded in the card medium MC, for example, by way of an F2F modulation method as shown in FIG. 2A, as an analog magnetic signal; wherein the card medium MC is an information medium (magnetic recording medium). Then, the analog magnetic signal S23 read out by the magnetic head 23 is supplied to the amplifier 28.

The amplifier 28 can be configured with a differential amplifier circuit using an operating amplifier; and the amplifier 28 amplifies the analog magnetic signal S23, read out and reproduced by the magnetic head 23, to an appropriate level with a predetermined gain, and then outputs an amplified analog magnetic signal (amplified signal) S28, as shown in FIG. 2B, to the level adjustment unit 29. For the amplifier 28, an intermediate value VM of the analog magnetic signal S28 to be output is set up, on the basis of a reference voltage Vref, for example, supplied from a reference voltage circuit that is not shown. The amplifier 28 carries out a gain control in such a way as to set an amplitude of a signal with a quarter of a full range.

The analog magnetic signal S28, which is read out by the analog magnetic head 23 and amplified by the amplifier 28, is a continuous analog (magnetic) as shown in FIG. 1 and FIG. 2B.

The level adjustment unit 29 makes a level adjustment in such a way that a voltage level of the magnetic signal S28 amplified by the amplifier 28 is within a predetermined converted voltage range VRNG in an A/D conversion unit of an analog front-end unit 32, to be described later in detail, and then outputs a magnetic signal S29 after the level adjustment, into an analog switch unit 31 of the reading process unit 30. In the present embodiment, as described later, the A/D conversion unit of the analog front-end unit 32 carries out A/D conversion with respect to the magnetic signal that has been adjusted by the level adjustment unit 29 so as to have a voltage level within the converted voltage range VRNG, in such a way that the signal is converted from an analog signal to a digital signal within the converted voltage range VRNG.

As shown in FIG. 3, the level adjustment unit 29 makes a level adjustment by way of adding a bias voltage VIS, corresponding to a center value of the predetermined converted voltage range VRNG, to the analog magnetic signal that has been input; and then, outputs the magnetic signal S29 after an addition of the bias voltage VIS, to the analog switch unit 31 of the reading process unit 30.

Figure 4:
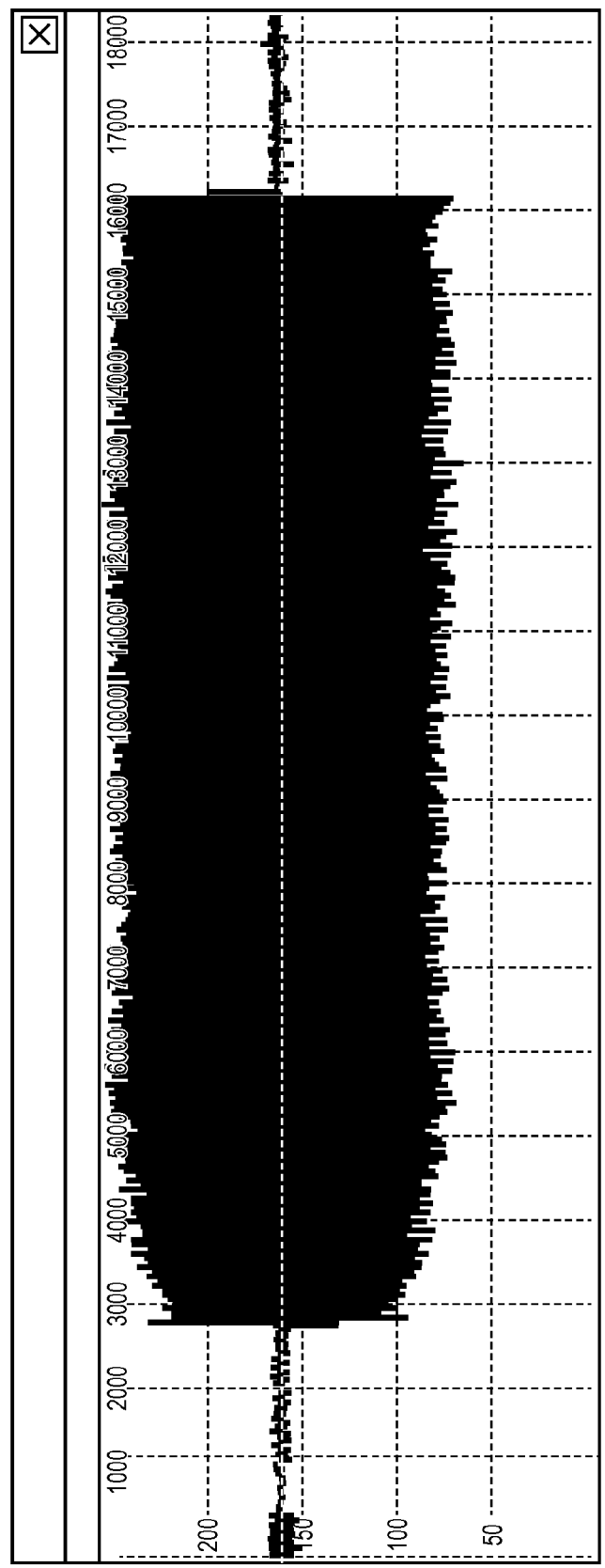
FIG. 4 is a diagram showing a specific waveform example of a magnetic signal displayed in a display unit according to the present embodiment.

FIG. 3 is a diagram schematically showing a process of adding the bias voltage VIS, corresponding to a center value of the predetermined converted voltage range VRNG, to the input analog magnetic signal in the level adjustment unit according to the present embodiment. FIG. 4 is a diagram showing a specific waveform example of a magnetic signal displayed in a display unit according to the present embodiment.

Incidentally, although the level adjustment unit 29 being in a transfer line for the analog magnetic signal, read out by the magnetic head 23, is located at an output side of the amplifier 28, which is before an input section to the reading process unit 30, in the present embodiment; it is simply required that the level adjustment unit 29 is located at any position within the transfer line up to the A/D conversion unit of the analog front-end unit 32, wherein the signal transfer line being for the analog magnetic signal read out by the magnetic head 23. In other words, the level adjustment unit 29 can be located at a position where a level adjustment can be made in such a way that A/D conversion can be carried out in the A/D conversion unit of the analog front-end unit 32 that is shared, within the same converted voltage range VRNG as for an image signal.

Namely, in the present embodiment, the level adjustment unit 29 makes a level adjustment by way of adding the bias voltage VIS, corresponding to a center value of the predetermined converted voltage range VRNG, to the analog magnetic signal that has been read out by the magnetic head 23; and in the meantime, the analog front-end unit 32 is so configured as to carry out A/D conversion with respect to the analog magnetic signal after the addition of the bias voltage, to convert the signal from an analog signal to a digital signal within the converted voltage range VRNG.

The first image sensor 24 and the second image sensor 25 are installed at a position above the card transfer path 21, and a position beneath the same, respectively. The first image sensor (a line sensor for the front side surface) 24 receives the light reflected by a front side surface MCa of the card medium MC, and outputs a first image signal (a line signal) S24 in accordance with the amount of received light, to the analog switch unit 31 of the reading process unit 30.

The second image sensor (a line sensor for the rear side surface) 25 receives the light reflected by a rear side surface MCb of the card medium MC, and outputs a second image signal (a line signal) S25 in accordance with the amount of received light, to the analog switch unit 31 of the reading process unit 30.

In the first image signal (hereinafter called a top-side image signal, or maybe simply called an image signal sometimes) read out by the first image sensor 24; a first row has an R (Red) image datum, a third row has a G (Green) image signal, and a fifth row has a B (Blue) image signal, in an example shown in FIG. 1. In the second image signal (hereinafter called a bottom-side image signal, or maybe simply called an image signal sometimes) read out by the second image sensor 25; a second row has an R (Red) image signal, a fourth row has a G (Green) image signal, and a sixth row has a B (Blue) image signal, in an example shown in FIG. 1.

The normal light sources (visible light) 26-1 and 27-1 are installed at a position above the card transfer path 21, and a position beneath the same, respectively. The normal light source (a normal light source for the front side surface) 26-1 irradiates the front side surface MCa of the card medium MC with visible light. The normal light source (a normal light source for the rear side surface) 27-1 irradiates the rear side surface MCb of the card medium MC with visible light. As the normal light sources 26-1 and 27-1, for example, an LED (Light Emitting Diode) and the like can be employed.

The infrared ray light sources 26-2 and 27-2 are installed at a position above the card transfer path 21, and a position beneath the same, respectively. The infrared ray light source (an infrared ray light source for the front side surface) 26-2 irradiates the front side surface MCa of the card medium MC with infrared ray light. The infrared ray light source (an infrared ray light source for the rear side surface) 27-2 irradiates the rear side surface MCb of the card medium MC with infrared ray light. As the infrared ray light sources 26-2 and 27-2, for example, an LED (Light Emitting Diode) and the like can be employed.

The ultraviolet light sources 26-3 and 27-3 are installed at a position above the card transfer path 21, and a position beneath the same, respectively. The ultraviolet light source (an ultraviolet light source for the front side surface) 26-3 irradiates the front side surface MCa of the card medium MC with ultraviolet light in order to highlight information for recognition, a fingerprint, and the like formed on the front side surface MCa of the card medium MC. The ultraviolet light source (an ultraviolet light source for the rear side surface) 27-3 irradiates the rear side surface MCb of the card medium MC with ultraviolet light in order to highlight information for recognition, a fingerprint, and the like formed on the rear side surface MCb of the card medium MC. As the ultraviolet light sources 26-3 and 27-3, for example, an LED (Light Emitting Diode) and the like can be employed.

(Reading Process Unit)

The reading process unit 30 includes an analog switch unit 31, an analog front-end unit (AFE) 32 having a function of an image processing integrated circuit (an image processing IC) as a main function, a transfer port 33, a digital signal processing unit 34 configured with a CPU and the like, a timing generator 35 as a timing control unit, and a memory 36.

In the present embodiment, as reading process modes, basically there are a magnetic signal reading mode (a first reading mode) for reading an analog magnetic signal, and an image signal reading mode (a second reading mode) for reading an analog image signal. In the present embodiment, a configuration is made in such a way that a mode signal MOD indicates whether a reading process mode is the magnetic signal reading mode (the first reading mode) for reading an analog magnetic signal, or the image signal reading mode (the second reading mode) for reading an analog image signal. The mode signal MOD is formed of, for example, a one-bit or two-bit signal; wherein in the case of a one-bit signal, for example, a high level (H) being set represents the magnetic signal reading mode (the first reading mode), and meanwhile a low level (L) being set represents the image signal reading mode (the second reading mode) for reading an analog image signal. A configuration is made in such a way that the mode signal MOD is set up in the digital signal processing unit 34, for example, in accordance with a detection result of a detection sensor, not illustrated, for detecting a card position and so on. In this regard, the above-described configuration is just an example, and various other methods can be employed, such as setting up a mode signal by the host device 40.

(Analog Switch Unit)

The analog switch unit 31 selects either the analog magnetic signal S29; which has been read out by the magnetic head 23, and amplified by the amplifier 28, and for which a level adjustment has been made by the level adjustment unit 29; or the analog image signals S24 & S25 read out by the first image sensor 24 and the second image sensor 25, in accordance with the mode signal MOD, and then outputs the analog signal to the analog front-end unit 32. If the mode signal MOD is supplied with a high level (H), the analog switch unit 31 selects the analog magnetic signal S29, and outputs the analog magnetic signal to the analog front-end unit 32. If the mode signal MOD is supplied with a low level (L), the analog switch unit 31 selects the analog image signal S24 or the analog image signal S25, and outputs the analog image signal to the analog front-end unit 32.

In the present embodiment, when the mode signal MOD is supplied with a low level (L), and moreover a timing signal TT, for example, of an active high level (H) from the timing generator 35 is received, the analog switch unit 31 selects the image signal S24 from the first image sensor 24 and outputs the image signal to the analog front-end unit 32. In the present embodiment, when the mode signal MOD is supplied with a low level (L), and moreover a timing signal TB, for example, of an active high level (H) from the timing generator 35 is received, the analog switch unit 31 selects the image signal S25 from the second image sensor 25 and outputs the image signal to the analog front-end unit 32.

Figure 5:
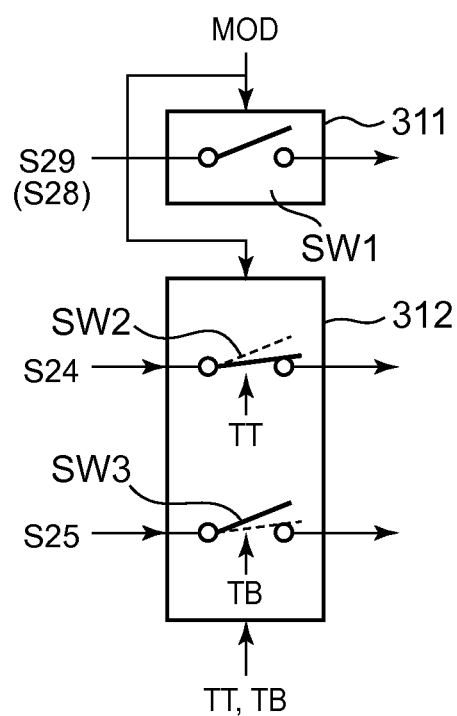
FIG. 5 is a diagram schematically showing a configuration example of an analog switch unit according to the present embodiment.

FIG. 5 is a diagram schematically showing a configuration example of an analog switch unit according to the present embodiment. An analog switch unit 31A shown in FIG. 5 is so configured as to include a first switch section 311 and a second switch section 312.

The first switch section 311 has a switch SW1, and the switch SW1 turns ON (for conducting) if an input terminal is supplied with the analog magnetic signal S29 while the mode signal MOD of a high level (H) is received, so as to transfer the magnetic signal S29 that has been input, to the analog front-end unit 32.

The second switch section 312 has a switch SW2 and another switch SW3, and there comes up an active state in which ON/OFF control of these switches SW2 and SW3 can be carried out, when the mode signal MOD of a low level (L) is received. In the second switch section 312, if a timing signal TT of an active high level (H) is received from the timing generator 35 in such an active state, the switch SW2 turns ON so as to transfer the image signal S24 from the first image sensor 24 to the analog front-end unit 32. At the time, the switch SW3 is in a state of OFF (not for conducting). In the second switch section 312, if a timing signal TB of an active high level (H) is received from the timing generator 35 in such an active state, the switch SW3 turns ON so as to transfer the image signal S25 from the second image sensor 25 to the analog front-end unit 32. At the time, the switch SW2 is in a state of OFF (not for conducting).

Essentially, the timing signal TT and the timing signal TB are set at an active high level (H) in a complementary manner. In other words, when the timing signal TT is set with an active high level (H), the timing signal TB is set with a non-active low level (L). In the meantime, when the timing signal TB is set with an active high level (H), the timing signal TT is set with a non-active low level (L).

Incidentally, the switches SW1, SW2, and SW3 are configured, for example, by employing an insulated gate field effect transistor (FET). For example, the switches SW1 through SW3 can be configured with a transmission gate in which sources and drains of a p-channel FET and an n-channel FET are connected each other, and the like.

(Analog Front-End Unit)

The analog front-end unit 32 is an analog signal processing unit having an optical clamping function (an offset function) as well as an A/D conversion function. In the present embodiment, the analog front-end unit 32 has an A/D conversion function for converting an analog signal to a digital signal, for example, in accordance with the mode signal MOD, while using a voltage according to a black reference voltage at the time of image reading as a bottom voltage, in synchronization with a clock ADCLK within the predetermined converted voltage range VRNG.

In the case where the mode signal MOD has a high level (H), and the analog magnetic signal S28 is selected by the analog switch unit 31, the analog front-end unit 32 carries out A/D conversion from an analog signal to a digital signal in the converted voltage range VRNG, in order to convert an analog magnetic signal that has been adjusted so as to have its voltage level within the converted voltage range VRNG by the level adjustment unit 29. Meanwhile, if the mode signal MOD has a low level (L), and the analog image signals S24 & S25 are selected by the analog switch unit 31, the analog front-end unit 32 carries out A/D conversion from an analog signal to a digital signal, with respect to the analog image signals S24 & S25 having their read-out level as it is.

Incidentally, the "black reference voltage" means a voltage VREFBottom as a reference for "0" in the case of multiple-bit steps; and it is 1V, for example, as an analog voltage range. Moreover, for example in the case of 10-bit A/D conversion, a voltage VREFTop as a reference for "$2^{10}=1023$" being a top of the steps is set up, on the basis of the reference voltage; and an analog voltage range is set, for example, with 2V (or 3V). In the meantime, the predetermined converted voltage range VRNG is a voltage range between the voltage VREFBottom as a reference for "0" and the voltage VREFTop as a reference for the top of the steps. The voltage VREFBottom and the voltage VREFTop are also included in the converted voltage range VRNG.

Figure 6:
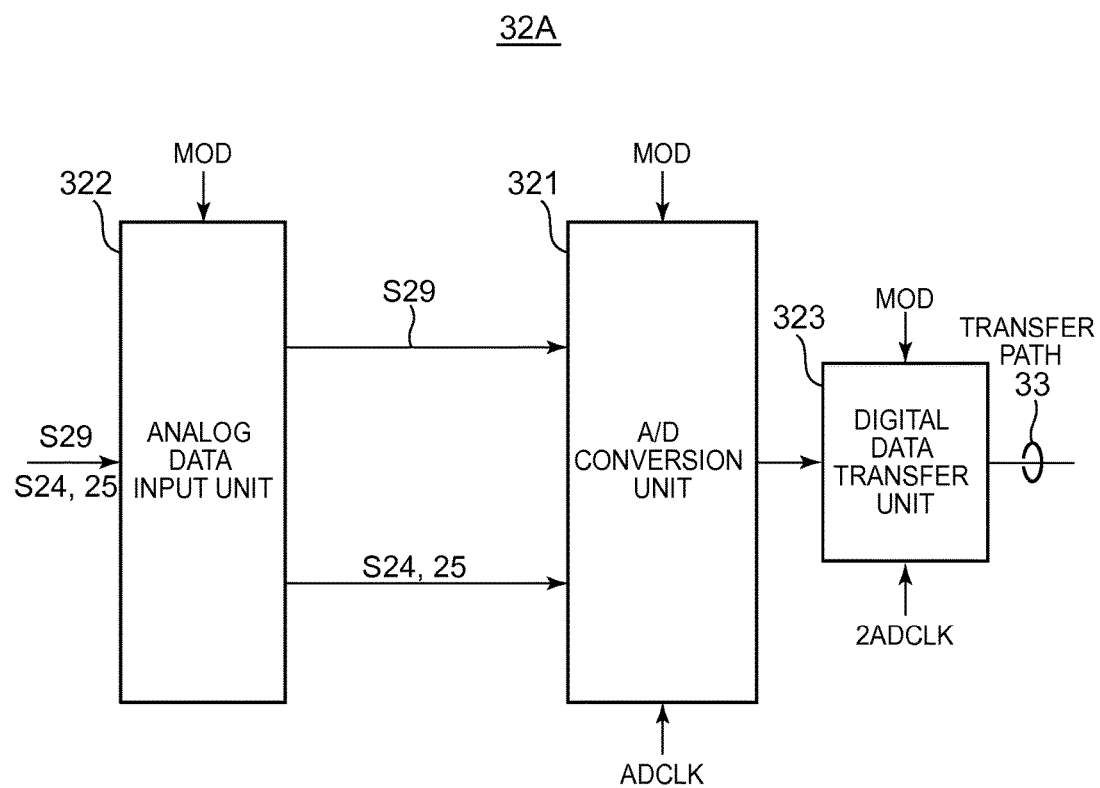
FIG. 6 is a diagram schematically showing a configuration example of an analog front-end unit according to the present embodiment.

FIG. 6 is a diagram schematically showing a configuration example of an analog front-end unit according to the present embodiment. An analog front-end unit 32A shown in FIG. 6 is so configured as to include an A/D conversion unit 321, an analog signal input unit 322, and a digital signal transfer unit 323.

The A/D conversion unit 321 carries out A/D conversion with respect to the analog magnetic signal S29 that is level-adjusted by the level adjustment unit 29 and supplied from the analog switch unit 31, and the analog image signals S24 & S25 supplied from the analog switch unit 31, to convert an analog signal into a digital signal by using the voltage, while using the voltage according to a black reference voltage at the time of image reading as the bottom voltage, in synchronization with the clock ADCLK within the predetermined converted voltage range VRNG. Assuming the magnetic signal reading mode (the first reading mode) in the case where the mode signal MOD is set with a high level (H), the A/D conversion unit 321 converts the analog magnetic signal S29, level-adjusted by the level adjustment unit 29 and supplied from the analog switch unit 31, to a digital magnetic signal. Meanwhile, assuming the image signal reading mode (the second reading mode) for reading an analog image signal in the case where the mode signal MOD is set with a low level (L), the A/D conversion unit 321 converts the analog image signals S24 & S25 supplied from the analog switch unit 31, to a digital signal having its level as it is.

Figure 7:
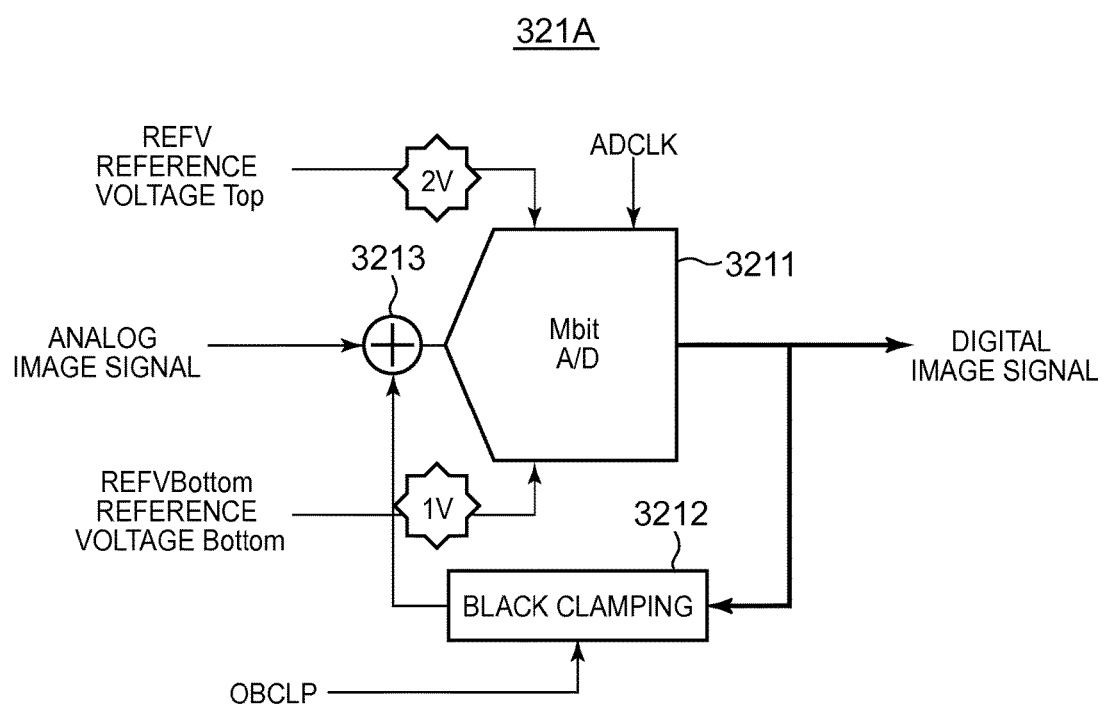
FIG. 7 is a diagram showing a configuration example of an A/D conversion unit in the analog front-end unit according to the present embodiment.

FIG. 7 is a diagram showing a configuration example of an A/D conversion unit in the analog front-end unit according to the present embodiment. An A/D conversion unit 321A shown in FIG. 7 is so configured as to include an A/D converter 3211, a black clamp circuit 3212, and an adder 3213.

The A/D converter 3211 is configured as an M-bit A/D converter, and the voltage VREFBottom as a reference for "0" is set so as to be 1V, and meanwhile the voltage VREFTop as a reference for the top of the steps is set so as to be 2V (or 3V). With a voltage range (magnitude) between the bottom reference voltage VREFBottom and the top voltage VREFTop as the converted voltage range VRNG (in this case, 1V or 2V), an A/D conversion is carried out to convert an input analog signal to a digital signal in synchronization with the clock ADCLK.

The black clamp circuit 3212 is a line clamping means for clamping an output digital signal from the A/D converter 3211 according to an optical black clamping pulse OBCLP, and outputting the signal to the adder 3213. Incidentally, in the black clamp circuit 3212, a clamping process is carried out during a black pixel output period for an analog image signal output from an image sensor. During the black pixel output period, the image sensor is light-blocked so that no change in level occurs even though any light (reflected light) comes in. The image sensor output during the black pixel output period is called "black level" as a reference for absolute black of an analog image signal. In other words, while clamping the black level by way of keeping an electric potential in one line constant, the black clamp circuit 3212 carries out a black level correction process with respect to an image sensor output during the black pixel output period with reference to the black level.

The adder 3213 adds an output from the black clamp circuit 3212 to an input analog signal (S323, S24, and S25), and inputs a result of the addition to the A/D converter 3211. Namely, the adder 3213 is used for a gain (sensitivity) adjustment, and it amplifies an input analog image signal in accordance with a specified gain (sensitivity).

Thus, the A/D conversion unit 321A according to the present embodiment feeds an output from the A/D converter 3211 to its input by use of the black clamp circuit 32122 and the adder 3213, for controlling the black level so as to be always at a constant value. Namely, in the present embodiment, the black clamp circuit 32122 makes a clamping adjustment (an offset adjustment), and the adder 3213 makes a gain adjustment, in order to materialize an adjustment for making a full use of a conversion range of the A/D converter 3211. The clamping adjustment (offset adjustment) makes an adjustment to maintain a constant reference voltage of the line sensor output from the first image sensor 24 and the second image sensor 25. In this way, the black clamp circuit 32122 as a line clamping means carries out line clamping, for example, with respect to an analog image datum in line cycles. In comparison with bit clamping for clamping in bit cycles, line clamping has a less number of clamping operations, and therefore it is effective for energy saving and improvement in a speed of reading an analog image datum. Moreover, the black clamp circuit 32122 as a line clamping means is suitable for an application in which high-speed A/D conversion is requested for a card scanner, office equipment, and the like, as described in the present embodiment.

The A/D converter 3211 carries out A/D conversion in synchronization with the clock ADCLK, wherein the clock ADCLK is, for example, supplied from the timing generator 35 as a timing control unit.

In the present embodiment, a frequency of the clock ADCLK of the A/D converter 3211 in the analog front-end unit 32, namely a sampling frequency, is differently controlled for an analog magnetic signal, and for an analog image signal. Moreover, the sampling frequency can arbitrarily be changed. The A/D converter 3211 in the analog front-end unit 32 carries out sampling an analog image signal (an analog magnetic signal) at a frequency of the preset clock ADCLK (sampling frequency) to convert the signal to a digital image signal (an analog magnetic signal) and output to the digital signal processing unit 34.

The analog signal input unit 322 inputs an output signal from the analog switch unit 31, and outputs the input signal supplied from the analog switch unit 31 to the A/D conversion unit 321, for example, according to the mode signal MOD. The analog signal input unit 322 inputs an output signal from the analog switch unit 31; and while assuming the magnetic signal reading mode (the first reading mode) in the case where the mode signal MOD is set with a high level (H), so as to judge that the input magnetic signal is the analog magnetic signal S29, the analog signal input unit 322 outputs the magnetic signal S29 to the A/D conversion unit 321. The analog signal input unit 322 inputs an output signal from the analog switch unit 31; and while assuming the image signal reading mode (the second reading mode) in the case where the mode signal MOD is set with a low level (L), so as to judge that the input magnetic signal is the analog image signal S24 or S25, the analog signal input unit 322 outputs the image signal S24 or S25 that has been input, to the A/D conversion unit 321.

Being connected with one end of the transfer port 33, the digital signal transfer unit 323 transfers either a digital magnetic signal or a digital image signal to which the A/D conversion unit 321 has converted in accordance with the mode signal MOD, in synchronization with, for example, a clock 2ADCLK that is a frequency of two times the clock ADCLK of a sampling frequency.

[Explanation with Regard to Sampling Frequency]

The sampling frequency of the A/D converter 3211 in the A/D conversion unit 321 is explained next. In the present embodiment, different sampling frequencies are individually applied to reading an image signal and reading a magnetic signal, as described below.

<Sampling Frequency for Reading an Image Signal>

When a reading clock for the first image sensor 24 and the second image sensor 25 is 8 MHz, and the sampling frequency is used in a 3-channel SHA mode for a common use by three channels, the sampling frequency for reading an image signal is set with 24 MHz, as a result of a calculation of (a reading clock for the image sensor: 8 MHz) multiplied by (3 channels).

<Sampling Frequency for Reading a Magnetic Signal>

The sampling frequency for reading a magnetic signal is set with a sampling frequency corresponding to a digital demodulation method (for example, a pattern matching method) so as to make it possible to divert the digital demodulation method. The sampling frequency for reading a magnetic signal can arbitrarily be set; and therefore in the present embodiment, a method having a proven experience is diverted for the purpose of shortening a design procedure. Actually, for example; if it is necessary to set a card transfer speed with 190 mm/s, and to have 19 samplings per bite (210 BPI), the sampling frequency for reading a magnetic signal is so set as to be 89.6 KHz according to a back calculation. Incidentally, in the present embodiment, it becomes possible to increase an apparent speed of transferring an analog image signal (an analog magnetic signal) by way of outputting an analog image signal and analog magnetic signal through multiple channels (three channels) in parallel. In other words, with the analog switch unit 31 installed before the A/D conversion unit 321 of the analog front-end unit 32, it is also possible to increase an entire speed of transferring data by way of converting at high speed in the A/D conversion unit 321 while the analog switch unit 31 carries out a switching operation.

<Modifications>

The sampling frequency at the time of reading a magnetic signal can arbitrarily be changed. For example, increasing a sampling frequency furthermore makes it possible to obtain a more detailed magnetic waveform.

Figure 8:
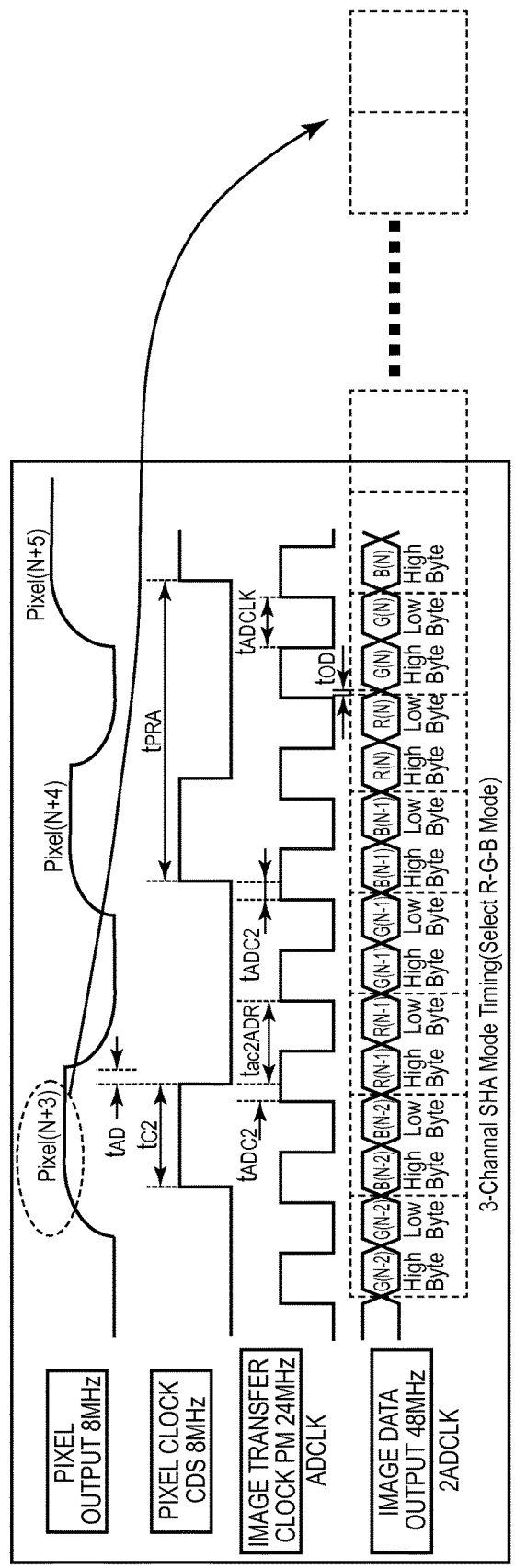
FIG. 8 is a diagram showing a series of processing waveforms starting from an input until an output of an image signal in the analog front-end unit according to the present embodiment.

FIG. 8 is a diagram showing a series of processing waveforms starting from an input until an output of an image signal in the analog front-end unit according to the present embodiment.

As described above, the analog front-end unit 32 is used in a 3-channel SHA mode, and a pixel signal is input in a cycle of 8 MHz. Then, A/D conversion is carried out by way of sampling with the clock ADCLK, corresponding to a pixel transfer clock of a frequency 24 MHz. Then, a digital signal after the A/D conversion is transferred to the transfer port 33 in synchronization with the clock 2ADCLK that is a frequency of two times the sampling frequency 24 MHz. Since the image signal transferred from the analog front-end unit 32 is a random signal, an image processing operation such as reordering operation and the like is needed in a later stage, namely in the host device 40 or the digital signal processing unit 34.

Moreover, the magnetic signal transferred from the analog front-end unit 32 is supplied to the digital signal processing unit 34, as it is, through the transfer port 33. Incidentally, sometimes a plurality of tracks are built in the magnetic stripe ms formed in the card medium MC, and a magnetic datum is recorded in each track (for example, in three tracks). In such a case, a processing operation such as reordering operation and the like with respect to a magnetic signal of each track (for example, of three tracks) is needed in a later stage, namely in the host device 40 or the signal processing unit 34.

With one end of the transfer port 33 being connected to a transfer section of the analog front-end unit 32, and the other end of the same being connected to a data receiving section of the signal processing unit 34, the transfer port 33 is configured, for example, with a video port for a DMA (Direct Memory Access) transfer; and the transfer port 33 transfers the digital magnetic signal or the digital image signal, having been A/D-converted in the analog front-end unit 32, to the digital signal processing unit 34, under the timing control of the timing generator 35. In the present embodiment, the sampling frequency for the analog magnetic signal is according to a timing control clock (sampling frequency) supplied from the timing generator 35. For example, timing of a sampling operation and timing required for a sampling operation, such as a sampling period, are set on the basis of the timing control clock (sampling frequency) supplied from the timing generator 35. Incidentally, as already described above, the timing generator 35 is able to create various clock patterns on the basis of a clock pattern setting register. Therefore, by way of arbitrarily setting a value of a clock pattern setting register, it is possible to adjust a clock required for the timing generator 35 as a sampling control unit.

FIGS. 9A-9H are diagrams showing an example of a series of steps of transferring an image signal through a transfer port, under control of a timing generator according to the present embodiment. FIGS. 9A-9H show an example of transferring a pixel signal according to a pixel arrangement at the upper side and the lower side shown in FIG. 1.

FIG. 9A, FIG. 9B, FIG. 9C, FIG. 9D, and FIG. 9E show; a vertical valid signal VValid, a horizontal valid signal HValid, a top signal Top representing that the signal is an upper side image signal at a side of the first image sensor 24, an upper side shift pulse PTRU representing that the upper side image signal at the side of the first image sensor 24 is transferred, and a black level signal LCLPU of the upper side image signal at the side of the first image sensor 24, respectively. FIG. 9F, FIG. 9G, and FIG. 9H show; a bottom signal Bottom representing that the signal is a lower side image signal at a side of the second image sensor 25, a lower side shift pulse PTRB representing that the lower side image signal at the side of the second image sensor 25 is transferred, and a black level LCLPB of the lower side image signal at the side of the second image sensor 25, respectively.

In an example of FIGS. 9A-9H, a cycle of one line is 391.5 micro-seconds; and each neighboring pixel of the upper and lower sides is transferred within 65.3 micro-seconds that is a half of 130.5 micro-seconds.

At first, the top signal Top is set at an active high level for 65.3 micro-seconds. Then, after the upper side shift pulse PTRU is set at a high level for a predetermined period, the black level signal LCLPU of the upper side image signal is set at a high level for a predetermined period at the timing of a rise of the horizontal valid signal HValid. Then, in connection with this movement described above, the upper-side R (red) image signal is transferred. The transfer is carried out with a black level of 72 to 80 pixels, 432 effective pixels, and 9 dummy pixels in the example of FIGS. 9A-9H. Next, the bottom signal Bottom is set at an active high level for 65.3 micro-seconds. Then, after the lower side shift pulse PTRB is set at a high level for a predetermined period, the black level signal LCLPB of the lower side image signal is set at a high level for a predetermined period at the timing of a rise of the horizontal valid signal HValid. Then, in connection with this movement described above, the lower-side R (red) image signal is transferred. The transfer is carried out with a black level of 72 to 80 pixels, 432 effective pixels, and 9 dummy pixels in the example of FIGS. 9A-9H.

Next, the top signal Top is set at an active high level for 65.3 micro-seconds. Then, after the upper side shift pulse PTRU is set at a high level for a predetermined period, the black level signal LCLPU of the upper side image signal is set at a high level for a predetermined period at the timing of a rise of the horizontal valid signal HValid. Then, in connection with this movement described above, the upper-side G (green) image signal is transferred. The transfer is carried out with a black level of 72 to 80 pixels, 432 effective pixels, and 9 dummy pixels in the same way as described above. Next, the bottom signal Bottom is set at an active high level for 65.3 micro-seconds. Then, after the lower side shift pulse PTRB is set at a high level for a predetermined period, the black level signal LCLPB of the lower side image signal is set at a high level for a predetermined period at the timing of a rise of the horizontal valid signal HValid. Then, in connection with this movement described above, the lower-side G (green) image signal is transferred. The transfer is carried out with a black level of 72 to 80 pixels, 432 effective pixels, and 9 dummy pixels in the same way as described above.

Next, the top signal Top is set at an active high level for 65.3 micro-seconds. Then, after the upper side shift pulse PTRU is set at a high level for a predetermined period, the black level signal LCLPU of the upper side image signal is set at a high level for a predetermined period at the timing of a rise of the horizontal valid signal HValid. Then, in connection with this movement described above, the upper-side B (blue) image signal is transferred. The transfer is carried out with a black level of 72 to 80 pixels, 432 effective pixels, and 9 dummy pixels in the same way as described above. Next, the bottom signal Bottom is set at an active high level for 65.3 micro-seconds. Then, after the lower side shift pulse PTRB is set at a high level for a predetermined period, the black level signal LCLPB of the lower side image signal is set at a high level for a predetermined period at the timing of a rise of the horizontal valid signal HValid. Then, in connection with this movement described above, the lower-side B (blue) image signal is transferred. The transfer is carried out with a black level of 72 to 80 pixels, 432 effective pixels, and 9 dummy pixels in the same way as described above.

The digital signal processing unit 34 carries out an image correction process and the like, with respect to an image signal transferred through the transfer port 33 from the analog front-end unit 32; and meanwhile, with respect to a continuous analog magnetic signal that has been transferred through the transfer port 33 from the analog front-end unit 32, the digital signal processing unit 34 carries out a predetermined process, or stores the signal as it is, into the memory 36, or the like.

Figure 10:
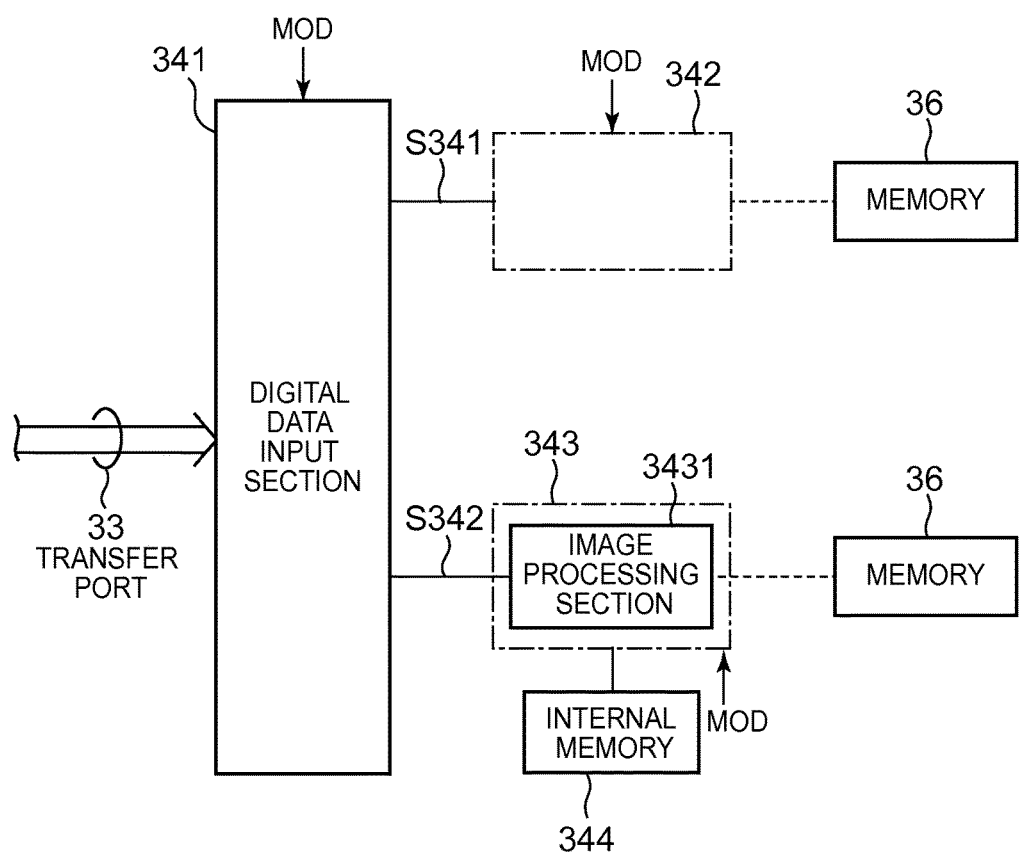
FIG. 10 is a diagram showing a configuration example of a digital signal processing unit according to the present embodiment.

FIG. 10 is a diagram showing a configuration example of a signal processing unit according to the present embodiment. The signal processing section 34A shown in FIG. 10 is so configured as to include a digital signal input section 341, a magnetic signal processing section 342, an image signal processing section 343, and an internal memory 344.

The digital signal input section 341 outputs an input signal transferred through the transfer port 33 according to the mode signal MOD, to the magnetic signal processing section 342 or the image signal processing section 343, for example, under the control of the timing generator 35. Assuming the magnetic signal reading mode in the case where the mode signal MOD is set with a high level (H), so as to judge that the input signal is a digital magnetic signal, the digital signal input section 341 outputs the magnetic signal as a signal 5341 to the magnetic signal processing section 342. Assuming the image signal reading mode in the case where the mode signal MOD is set with a low level (L), so as to judge that the input signal is a digital image signal, the digital signal input section 341 outputs the input image signal as a signal 5342 to the image signal processing section 343.

The magnetic signal processing section 342 carries out a predetermined process with respect to a continuous digital magnetic signal supplied from the digital signal input section 341. The magnetic signal processing section 342 carries out a process, such as storing the supplied magnetic signal into the memory 36, and the like. Incidentally, in the present embodiment, a demodulation process for a magnetic signal is carried out at a side of the host device 40. Moreover, the demodulation method is not limited to a pattern matching method. Incidentally, the pattern matching method, which is one of demodulation methods, is a demodulation method, for example, disclosed in Japanese Unexamined Patent Application Publication No. 2000-173008; and a detailed explanation about the method is skipped here. Incidentally, it is also possible to make a configuration in such a way that the demodulation process for a magnetic signal is carried out, for example, by the magnetic signal processing section 342 at a side of the digital signal processing unit 34.

The image signal processing section 343 is so configured as to include an image processing section 3431 for carrying out a predetermined image correction process and the like, with respect to a random digital image signal supplied by the digital signal input section 341. The image signal processing section 343 carries out a process, such as storing an image signal into the memory 36, and the like; wherein the image processing section 3431 has executed an image processing operation with respect to the image signal. In the present embodiment, reordering the random digital image signal is carried out in the host device 40. Incidentally, it is also possible to make a configuration in such a way that the reordering process is carried out at a side of the signal processing section 34A. At a side of the host device 40, for example, an image is displayed on a display unit 41.

Figure 11:
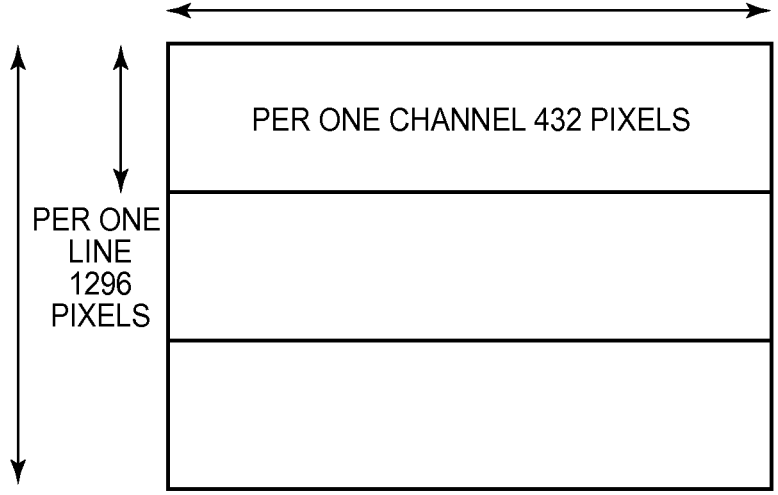
FIG. 11 is a diagram showing an example of size of a final image to be processed in the present embodiment.
Figure 12:
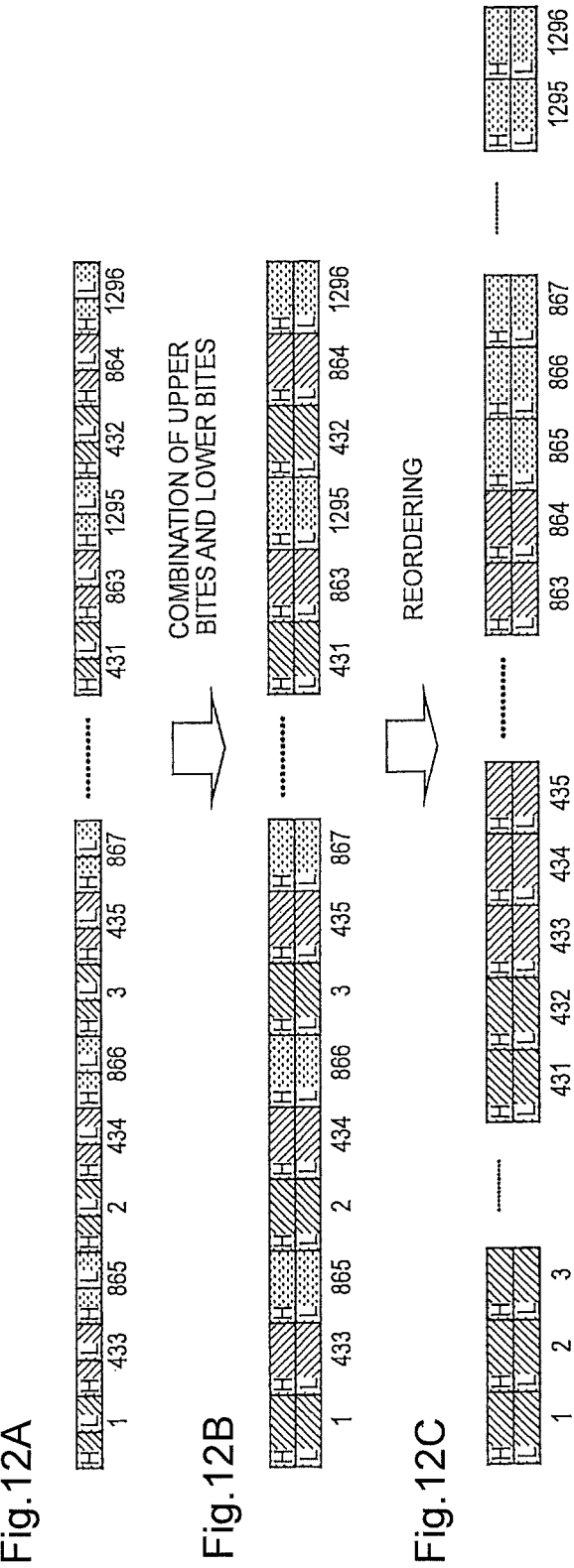
FIGS. 12A-12C are diagrams showing an example of a reordering process for an image signal according to the present embodiment.

The process of reordering a random digital image signal is explained below. FIG. 11 is a diagram showing an example of size of a final image to be processed in the present embodiment. FIGS. 12A-12C are diagrams showing an example of a reordering process for an image signal according to the present embodiment. Incidentally, in FIGS. 12A-12C, a signal shown with 'H' is an upper side image signal (upper side image signal); and in the meantime, a signal shown with 'L' is a lower side image signal (lower side image signal).

Size of a final image in this example is 2341 pixels×1296 images, and image resolution is 600 DPI, as shown in FIG. 11. In a final image FIM, one line is composed of 1296 pixels, and one channel includes 432 pixels.

In the process of reordering, image signals randomly arranged as shown in FIG. 12A are reordered in such a way as to combine an upper bite and a lower bite as shown in FIG. 12B; and then, combined signals are reordered according to an order of the pixel array as shown in FIG. 12C.

The timing generator 35 creates a timing signal including a clock for a process appropriate to an image signal or a magnetic signal, according to the mode signal MOD; and then controls operations of the first image sensor 24, the second image sensor 25, the first light source unit 26, the second light source unit 27, the analog switch unit 31, the analog front-end unit 32, the transfer port 33, and the signal processing unit 34, in accordance with the created timing signal. The timing generator 35 conducts control in such a way that a sampling frequency for A/D conversion in the analog front-end unit 32 becomes different between the analog magnetic signal S29 and the analog image signals S24 & S25. The timing generator 35 is able to modify the sampling frequency for A/D conversion with respect to, at least the magnetic signal, out of the magnetic signal and the image signal in the analog front-end unit 32.

Figure 13:
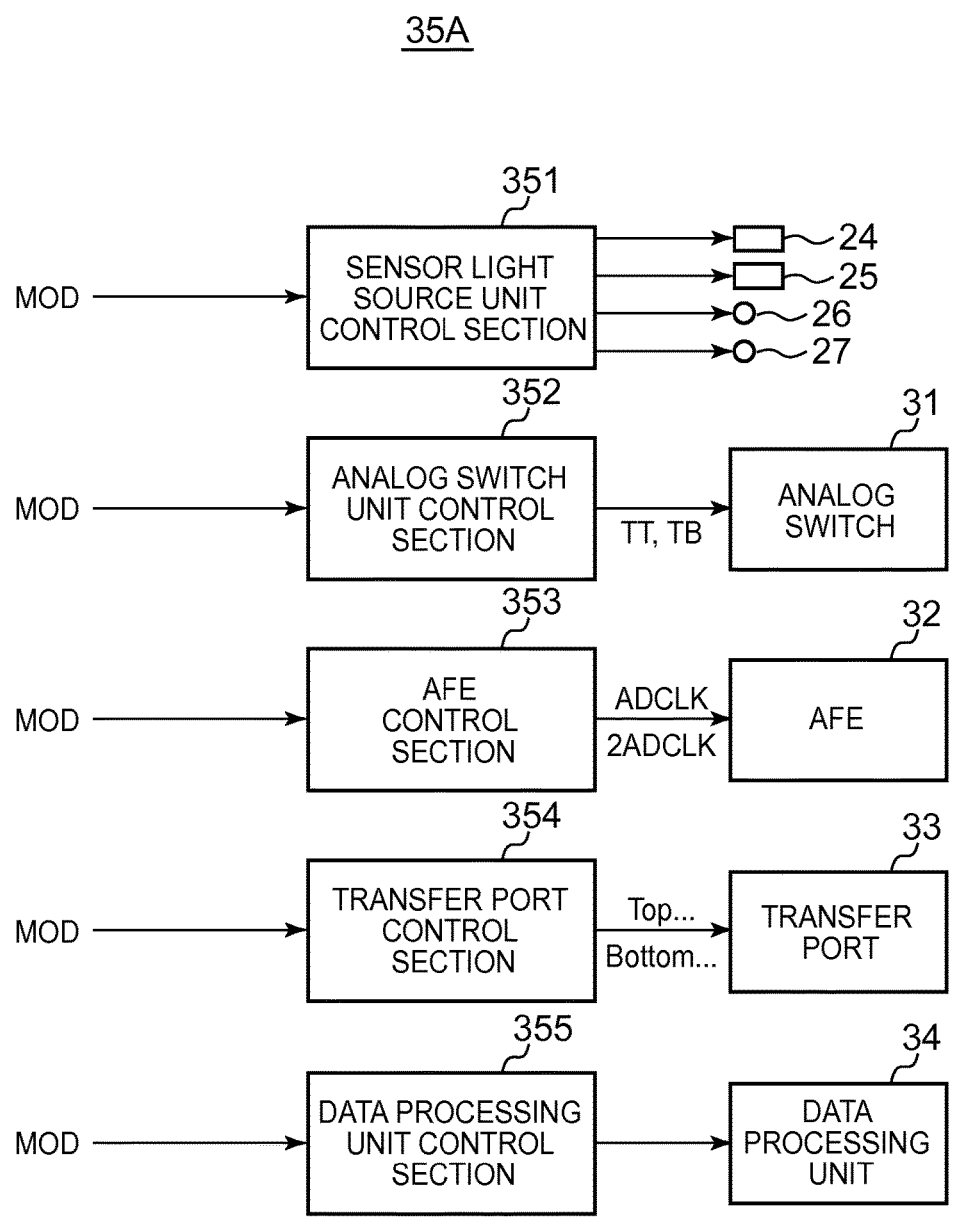
FIG. 13 is a diagram showing a configuration example a key section of a timing generator according to the present embodiment.
Figure 14:
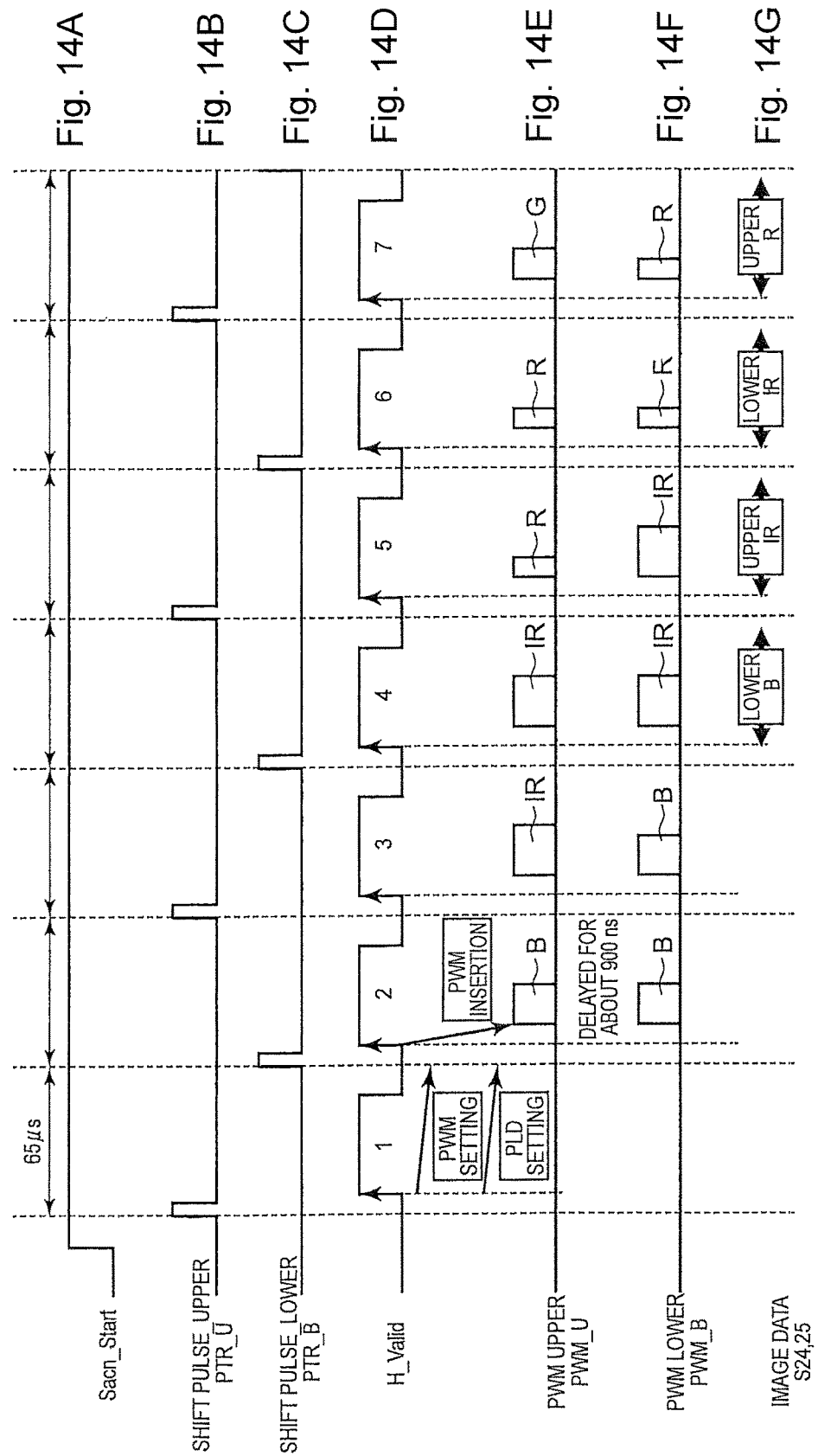
FIGS. 14A-14G are diagrams for explaining an example of control operation for an image signal in a sensor light source unit control section of the timing generator according to the present embodiment.

FIG. 13 is a diagram showing a configuration example of a key section of a timing generator according to the present embodiment. A timing generator 35A shown in FIG. 13 is so configured as to include a sensor light source unit control section 351, an analog switch unit control section 352, an AFE (analog front-end unit) control section 353, a transfer port control section 354, and a signal processing unit control section 355.

In the image signal reading mode (the second reading mode), the sensor light source unit control section 351 outputs a drive signal to an image signal reading operation control system, which is not illustrated, for the first image sensor 24, the second image sensor 25, the first light source unit 26, and the second light source unit 27, in order to carry out a drive control with respect to read-timing of an image signal, including illumination operation, and the like. The sensor light source unit control section 351 does not carry out a control operation with respect to an image signal in the case of the magnetic signal reading mode (the first reading mode).

FIGS. 14A-14G are diagrams for explaining an example of control operation for an image signal in a sensor light source unit control section of the timing generator according to the present embodiment.

FIG. 14A, FIG. 14B, FIG. 14C, FIG. 14D, FIG. 14E, FIG. 14F, and FIG. 14G show; a scanning start signal Scan Start (a signal representing a start of reading an image datum), an upper side shift pulse PTRU that represents transferring an upper side image signal from the first image sensor 24, a lower side shift pulse PTRB that represents transferring an lower side image signal from the second image sensor 25, a horizontal valid signal HValid, an upper side light source drive signal PWMU for PWM-driving (LED lighting control) a pre-specified light source of the first light source unit 26, a lower side light source drive signal PWMB for PWM-driving (LED lighting control) a pre-specified light source of the second light source unit 27, and the image signals S24 & S25 read by the first image sensor 24 and the second image sensor 25, respectively.

In this explanation, each signal is output from the sensor light source unit control section 351 to the image signal reading operation control system, in the image signal reading mode.

In an example shown in FIGS. 14A-14G as well, a cycle of one line is 391.5 micro-seconds, and each neighboring pixel of the upper and lower sides is transferred within 65.3 micro-seconds that is a half of 130.5 micro-seconds, in the same way as the example shown in FIGS. 9A-9H.

In the image signal reading mode, a signal is output to the image signal reading operation control system, in a state where the scanning start signal Scan Start is at an active high level (H). Then, after the upper side shift pulse PTRU is set with a high level for a predetermined period, the horizontal valid signal HValid is set with an active high level for a predetermined period. Incidentally, this is just an example, and a configuration can be made in such a way that operation of a reading process is controlled while the horizontal valid signal HValid is set with an active low level (L) for a predetermined period. Then, after the horizontal valid signal HValid is set with a low level (L); when 65 micro-seconds has passed after the upper side shift pulse PTRU is set with a high level, the lower side shift pulse PTRB is set with a high level for a predetermined period. Subsequently, the horizontal valid signal HValid is set with an active high level (H) for a predetermined period. After the lower side shift pulse PTRB is set with a high level, the upper side light source drive signal PWMU and the lower side light source drive signal PWMB are output with an active high level for a predetermined period, in order to carry out an operation control for the first light source unit 26 and the second light source unit 27. In this case, in an example shown in FIGS. 14A-14G, the normal light sources 26-1 and 27-1 of the first light source unit 26 and the second light source unit 27 are operated. Then, after the horizontal valid signal HValid is set with a low level (L); when 65 micro-seconds has passed after the lower side shift pulse PTRB is set with a high level, the upper side shift pulse PTRU is set with a high level for a predetermined period. Subsequently, the horizontal valid signal HValid is set with an active high level (H) for a predetermined period. After the upper side shift pulse PTRU is set with a high level, the upper side light source drive signal PWMU and the lower side light source drive signal PWMB are output with an active high level for a predetermined period, in order to carry out an operation control for the first light source unit 26 and the second light source unit 27. In this case, in an example shown in FIGS. 14A-14G, the infrared ray light source (IR) 26-2 is operated in the first light source unit 26, and meanwhile, the normal light source (IR) 27-1 is operated in the second light source unit 27.

The operation described above is repeated. Operation control of the first light source unit 26 and the second light source unit 27 is carried out while the normal light sources, the IR light sources, and the UV light sources are appropriately selected.

In the image signal reading mode, the analog switch unit control section 352 sets the timing signal TT and the timing signal TB at an active high level (H) in a complementary manner, and outputs the timing signal to the second switch section 312 of the analog switch unit 31.

In the magnetic signal reading mode, the AFE control section 353 supplies the A/D conversion unit 321 of the analog front-end unit 32 with the clock ADCLK for which the sampling frequency is so set as to be a frequency corresponding to magnetic datum reading, for example 89.6 KHz. Moreover, in this magnetic signal reading mode, the AFE control section 353 supplies a digital signal transfer unit 324 of the analog front-end unit 32 with the signal transfer clock 2ADCLK that is a frequency of two times the sampling frequency.

In the image signal reading mode, the AFE control section 353 supplies the A/D conversion unit 321 of the analog front-end unit 32 with the clock ADCLK for which the sampling frequency is so set as to be a frequency corresponding to image datum reading, for example 24 MHz. Moreover, in this image signal reading mode, the AFE control section 353 supplies the digital signal transfer unit 324 of the analog front-end unit 32 with the signal transfer clock 2ADCLK that is a frequency of two times the sampling frequency.

Figure 9:
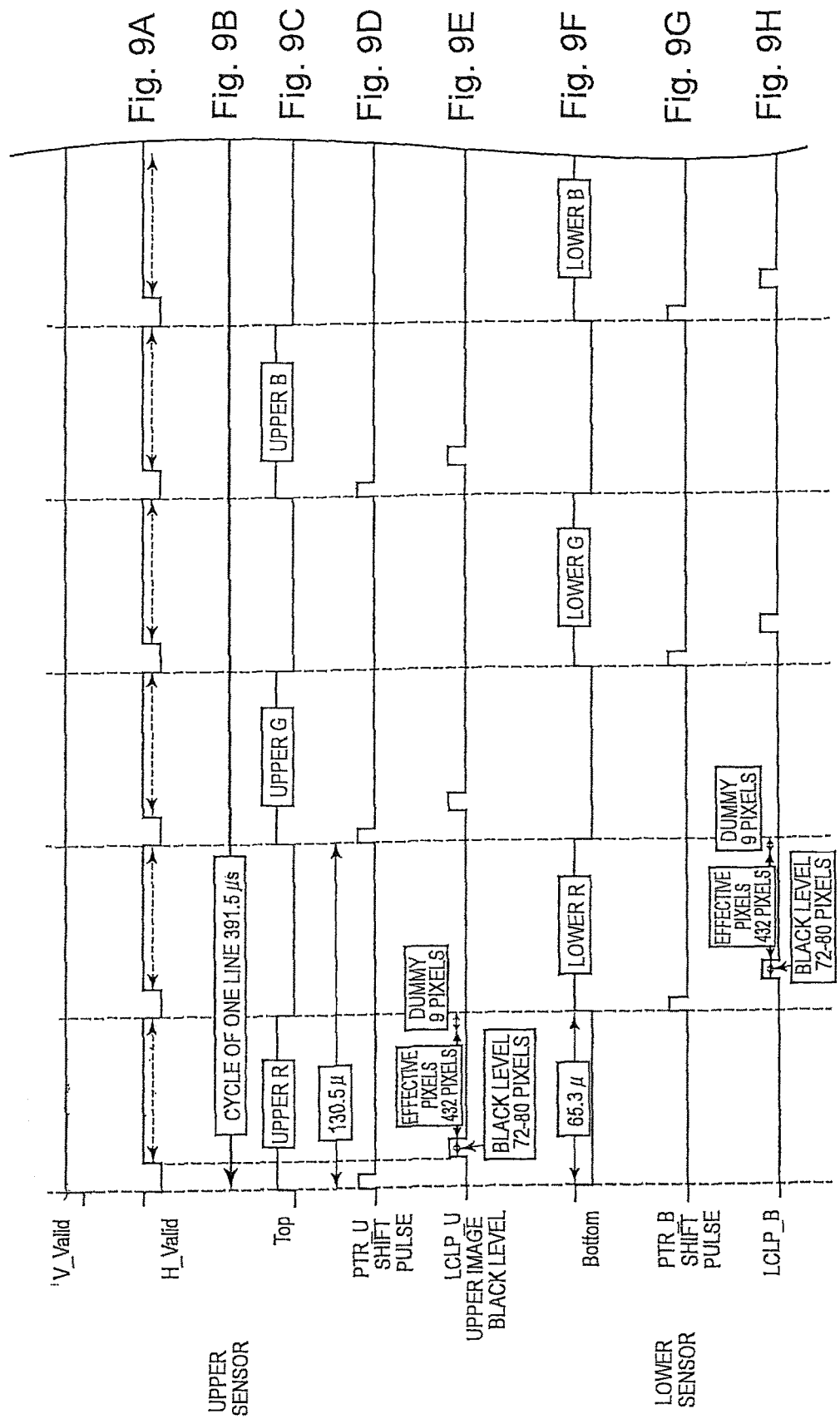
FIGS. 9A-9H are diagrams showing an example of a series of steps of transferring an image signal through a transfer port, under control of a timing generator according to the present embodiment.

In the image signal reading mode, the transfer port control section 354 outputs the vertical valid signal VValid, the horizontal valid signal HValid, the top signal Top, the upper side shift pulse PTRU, the black level signal LCLPU, the bottom signal Bottom, the lower side shift pulse PTRB, and the black level LCLPB, which are for controlling a transfer operation as shown in FIG. 9, to a control system of the transfer port 33, which is not illustrated; and controls a transfer operation for an image signal.

In the magnetic signal reading mode, the signal processing unit control section 355 creates and supplies an operation timing signal and the like, in the magnetic signal processing section 342 of the signal processing unit 34. In the image signal reading mode, the signal processing unit control section 355 creates and supplies a timing signal for operation such as an image correction process and the like, in the image signal processing section 343 of the digital signal processing unit 34. Moreover, at the time of carrying out a control operation with respect to a digital magnetic signal or a digital image signal, the signal processing unit control section 355 controls digital signal receiving, in the signal processing unit 34, with respect to the magnetic signal and the image signal that are transferred through the transfer port 33.

A configuration and a function of each unit of the information medium reading device 10 according to the present embodiment are described above in detail. An overall operation of the information medium reading device 10 according to the present embodiment is explained next.

[General Operation of the Information Medium Reading Device 10]

Figure 15:
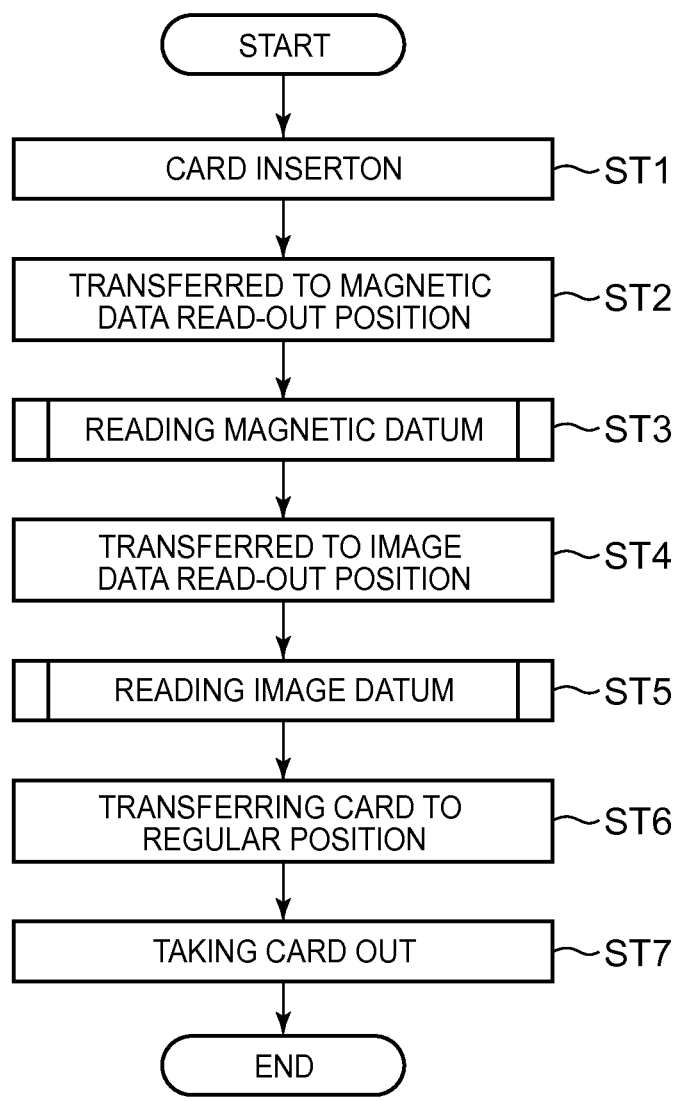
FIG. 15 is a flowchart for explaining a general operation of the information medium reading device according to the present embodiment.
Figure 16:
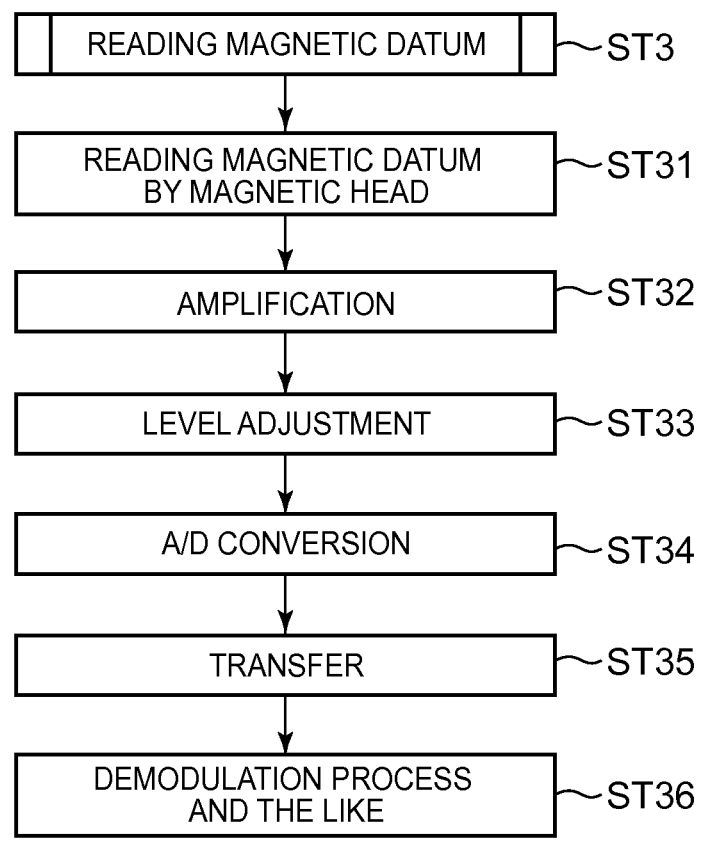
FIG. 16 is a flowchart for explaining a magnetic signal reading process of FIG. 15.
Figure 17:
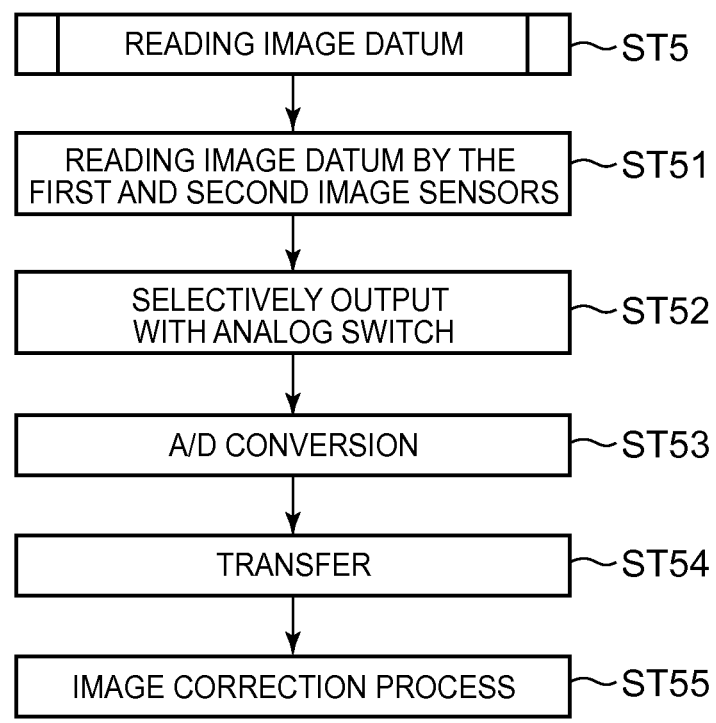
FIG. 17 is a flowchart for explaining an image signal reading process of FIG. 15.

FIG. 15 is a flowchart for explaining a general operation of the information medium reading device according to the present embodiment. FIG. 16 is a flowchart for explaining a magnetic signal reading process of FIG. 15. FIG. 17 is a flowchart for explaining an image signal reading process of FIG. 15.

If the card medium MC is inserted into the card transfer path 21 (Step ST1), the inserted card medium MC is transferred into an installation spot of the magnetic head 23 by the card transfer unit 22 (Step ST2). At the time, the information medium reading device 10 is in the magnetic signal reading mode (the first reading mode), and reading an analog magnetic signal is carried out (Step ST3).

In the magnetic signal reading process of Step ST3, at first an analog magnetic signal of the magnetic stripe ms is read out (Step ST31), as shown in FIG. 16. The analog magnetic signal S23 read out by the magnetic head 23 is amplified by the amplifier 28 (Step ST32), and then the analog magnetic signal S28 that has been amplified is supplied to the level adjustment unit 29. In the level adjustment unit 29, a level adjustment is made (Step ST33) by way of adding the bias voltage VIS, corresponding to a center value of the predetermined converted voltage range VRNG, to the magnetic signal S28 read out by the magnetic head 23, as shown in FIG. 3. The magnetic signal S29 after the level adjustment is supplied to the analog switch unit 31. In the analog switch unit 31, the mode signal MOD is supplied so as to represent the magnetic signal reading mode (the first reading mode), so that the first switch section 311 is turned ON. As a result, the magnetic signal S28, which has been input into the analog switch unit 31, is transferred to the analog front-end unit 32 by way of the first switch section 311.

In the analog front-end unit 32, the mode signal MOD is supplied, for example, so as to represent the magnetic signal reading mode (the first reading mode); so that a signal, having been input into the analog signal input unit 322, is judged to be the analog magnetic signal S29; and the analog magnetic signal S29 for which a level adjustment has already been made is output to the A/D conversion unit 321.

In the A/D conversion unit 321, A/D conversion is carried out with respect to the analog magnetic signal S29 for which a level adjustment has already been made, for converting the analog signal into a digital signal (Step ST34) while using a voltage according to a black reference voltage at the time of image reading as a bottom voltage, in synchronization with a clock ADCLK within the predetermined converted voltage range VRNG. Then, in the digital signal transfer unit 323, the magnetic signal converted into the digital signal by the A/D conversion unit 321 is transferred to the digital signal processing unit 34 (Step ST35), in synchronization with, for example, a clock 2ADCLK that is a frequency of two times the clock ADCLK of a sampling frequency. In the digital signal processing unit 34, a predetermined process is carried out (Step ST36) with respect to the continuous magnetic signal transferred through the transfer port 33 from the analog front-end unit 32. By way of the steps described above, the magnetic signal reading process finishes.

Next, as Step ST4 shows in FIG. 15, the card medium MC is transferred to an image signal reading position; that is to say, an image signal reading spot where the first image sensor 24, the second image sensor 25, the first light source unit 26, and the second light source unit 27 are placed. At the position, the information medium reading device 10 gets into the image signal reading mode (the second reading mode), and reading an image signal is carried out (Step ST5).

In the image signal reading process of Step ST5, as shown in FIG. 17, at first the image IM formed on the front side surface and the rear side surface of the card medium MC is read out by the first image sensor 24 and the second image sensor 25, for example, in such a way as to read the front side surface and the rear side surface alternately (Step ST51), while a lighting state of the first light source unit 26 and the second light source unit 27 is controlled by the timing generator 35. The analog image signals S24 and S25 read out by the first image sensor 24 and the second image sensor 25 are supplied to the analog switch unit 31. The analog switch unit 31 is supplied with the mode signal MOD representing the image signal reading mode (the second reading mode), so that the second switch section 312 is turned ON. Meanwhile, in the analog switch unit 31, the switches SW2 and SW3 are so controlled with the timing signals TT and TB from the timing generator 35, as to turn ON and OFF in a complementary manner, so that the top-side image signal S24 read out by the first image sensor 24 and the bottom-side image signal S25 read out by the second image sensor 25 are alternately transferred to the analog front-end unit 32 (Step ST52).

The analog front-end unit 32 is supplied with the mode signal MOD representing the image signal reading mode (the second reading mode), and therefore the signal input into the analog signal input unit 322 is judged to be the analog image signals S24 & S25, and the analog image signals S24 & S25 are output to the A/D conversion unit 321.

In the A/D conversion unit 321, A/D conversion is carried out with respect to the analog magnetic signals S24 & S25 for converting the analog signal into a digital signal (Step ST53) while using a voltage according to a black reference voltage at the time of image reading as a bottom voltage, in synchronization with a clock ADCLK within the predetermined converted voltage range VRNG. Then, in the digital signal transfer unit 323, the magnetic signal converted into the digital signal by the A/D conversion unit 321 is transferred to the signal processing unit 34 (Step ST54), in synchronization with, for example, a clock 2ADCLK that is a frequency of two times the clock ADCLK of a sampling frequency. In the digital signal processing unit 34, a predetermined image correction process or the like is carried out (Step ST55) with respect to the magnetic signal transferred through the transfer port 33 from the analog front-end unit 32. By way of the steps described above, the image signal reading process finishes.

After the image signal reading process finishes, the card medium MC is transferred by the card transfer unit 22, in an unloading direction to a regular position in a card insertion area, as ST6 shows in FIG. 15. Then, a user or another reasonable person takes out the card medium MC for which the magnetic signal reading process and the image signal reading process have been carried out (Step ST7).

Primary Advantageous Effect of the Present Embodiment

As described above, the information medium reading device 10 of the present embodiment includes; the card handling unit 20, and the reading process unit 30 to be used in common for handling an output from the card handling unit 20. The card handling unit 20 includes; the magnetic head 23 for reading a magnetic signal recorded in an information medium, such as the card medium MC; the first image sensor 24 and the second image sensor 25 that take a photo of and read out, at least one side of a front side surface and a rear side surface of the information medium, for example image signals of both the sides; the first light source unit 26 for lighting an imaging area of the first image sensor 24; and the second light source unit 27 for lighting an imaging area of the second image sensor 25.

Moreover, either the card handling unit 20 or the reading process unit 30 includes the level adjustment unit 29 that makes an adjustment for having a voltage level of a magnetic signal read out by the magnetic head 23 within the converted voltage range VRNG. The reading process unit 30 includes the analog switch unit 31, the analog front-end unit 32, the transfer port 33, the signal processing unit 34, and the timing generator 35 as a timing control unit. The analog switch unit 31 selects either a magnetic signal read out by the magnetic head 23, or an image signal read out by the first image sensor 24 and the second image sensor 25 in accordance with the mode signal MOD, and outputs the selected signal. The analog front-end unit 32 has an A/D conversion function for converting an analog signal to a digital signal, while using a voltage according to a black reference voltage at the time of image reading as a bottom voltage, in synchronization with a clock ADCLK within the predetermined converted voltage range VRNG. If an image signal is selected by the analog switch unit 31, the analog front-end unit 32 carries out A/D conversion from an analog signal to a digital signal, with respect to the image signal having its input level as it is. In the meantime, if a magnetic signal is selected by the analog switch unit 31, the analog front-end unit 32 carries out A/D conversion from an analog signal to a digital signal within the converted voltage range, to convert the magnetic signal that has been adjusted so as to have its voltage level within the converted voltage range VRNG.

The transfer port 33 transfers the digital magnetic signal or the digital image signal for which the analog front-end unit 32 has carried out A/D conversion, to the digital signal processing unit 34, by using the same transfer route, under the control of the timing generator 35. The digital signal processing unit 34 carries out an image correction process and the like, with respect to the image signal transferred from the analog front-end unit 32; and meanwhile, with respect to the continuous magnetic signal that has been transferred from the analog front-end unit 32, the digital signal processing unit 34 carries out a predetermined process. The timing generator 35 creates a timing signal including a clock for a process appropriate to an image signal or a magnetic signal, according to the mode signal MOD; and then controls operations of the first image sensor 24, the second image sensor 25, the first light source unit 26, the second light source unit 27, the analog switch unit 31, the analog front-end unit 32, the transfer port 33, and the signal processing unit 34, in accordance with the created timing signal. The timing generator 35 conducts control in such a way that a sampling frequency for A/D conversion in the analog front-end unit 32 becomes different between the analog magnetic signal S28 and the analog image signals S24 & S25. The timing generator 35 is able to modify the sampling frequency for A/D conversion with respect to, at least the magnetic signal, out of the magnetic signal and the image signal in the analog front-end unit 32.

Therefore, according to the present embodiment, it becomes possible to obtain an effect described below. In the information medium reading device according to the present embodiment, an image signal reading system (an image signal processing system) for carrying out a signal process for an image signal read out by the image sensor, and a magnetic signal reading system (a magnetic signal processing system) for carrying out a signal process for an magnetic signal read out by the magnetic head are materialized as a signal processing system in common. Therefore, in the information medium reading device (a card scanner), it becomes unnecessary for reading a magnetic signal to have a configuration including a subordinate circuit board, on which a dedicated IC for reading a magnetic signal is mounted, in addition to a main circuit board; so that the IC for reading a magnetic signal and a peripheral circuit component are not needed, and moreover separately providing circuit boards is unnecessary, and therefore it is possible to avoid enlargement of a circuit scale, enlargement of a unit, and increase in cost. In other words, according to the present embodiment, a system of reading an image signal and a system of reading a magnetic signal can be materialized by using the same signal processing system, namely by using the analog front-end unit as an analog signal processing unit in common. Accordingly, there exists an advantage that the number of components can be reduced, and enlargement of a circuit scale as well as enlargement of a unit can be controlled in order to eventually result in cost reduction.

Furthermore, an analysis of reading a magnetic datum can easily be carried out because the same signal processing system as for an image datum can be used in common. Moreover, accuracy of reading a magnetic signal can be improved by way of increasing a sampling frequency. Furthermore, an analysis of reading a magnetic signal can easily be carried out because the same signal processing system as for an image signal can be used in common. Then, a series of processes for an image signal can be carried out with a high degree of accuracy by using a processing system to be shared with the magnetic signal reading system in common. In the same way, a series of processes for a magnetic signal can be carried out with a high degree of accuracy by using a processing system to be shared with the image signal reading system in common. Moreover, it is possible to suitably carry out a signal process appropriate to a signal transfer mode.

Other Embodiments

As described above, a sampling frequency at the time of reading a magnetic signal can arbitrarily be changed. For example, by way of further increasing a sampling frequency, more detailed analog magnetic signal (its waveform) can be obtained. Moreover, it is expected to apply the technology to a card inspection machine. A card inspection can easily be carried out by displaying a waveform of a magnetic signal on the display unit 41, for example as shown in FIG. 4. Furthermore, it also becomes possible to cope with a reading-backward process. Since a magnetic waveform can be obtained as a digital signal, it also becomes easy to cope with a reading-backward process in which a magnetic signal is read out at the time of unloading a card.

Incidentally, although the above-described embodiment is explained as an example in which the information medium is a card medium, at least an embodiment of the present invention can also be applied to another type of information medium such as an ID card, in which magnetic information is recorded.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information medium reading device for use with an information medium having a magnetic datum recorded thereon and an image datum positioned on a surface of the information medium, the information medium reading device comprising:

a magnetic head structured to read the magnetic datum recorded in the information medium, and output an analog magnetic signal;

an image sensor structured to take a photo of the image datum positioned on the surface of the information medium, and output an analog image signal;

an analog switch unit structured to select one of the analog magnetic signal and the analog image signal according to a mode signal of a signal-reading mode, and output the selected one;

an analog front-end unit having an analog/digital (A/D) conversion function for converting an analog signal to a digital signal, while using a voltage according to a black reference voltage at the time of image reading, as a bottom voltage, within a predetermined converted voltage range;

a level adjustment unit structured to make a level adjustment by way of adding a bias voltage, corresponding to a center value of the predetermined converted voltage range, with respect to a voltage level of the analog magnetic signal; and a timing control unit structured to create a timing signal including a clock for a process appropriate to the analog image signal or the analog magnetic signal, according to the mode signal of a signal-reading mode; and controlling operations of at least the analog switch unit, the analog front-end unit, and the level adjustment unit, in accordance with the created timing signal;

wherein the analog magnetic signal, for which the level adjustment has been made in the level adjustment unit, is input into the analog front-end unit, and an A/D conversion is carried out for converting an analog signal to a digital signal.

2. The information medium reading device according to claim 1:

wherein the image sensor is a line sensor arranged linearly for receiving light from an information medium; and the analog front-end unit comprises a clamping circuit structured to clamp the analog signal output from the line sensor, in line cycles.

3. The information medium reading device according to claim 1:

wherein the level adjustment unit is positioned between the magnetic head and the analog switch unit.

4. The information medium reading device according to claim 1:

wherein the timing control unit is structured to control in such a way that a sampling frequency for A/D conversion in the analog front-end unit becomes different between the magnetic datum and the image datum.

5. An information medium reading method comprising:

reading a magnetic datum recorded in an information medium with a magnetic head, and outputting an analog magnetic signal;

taking a photo of an image datum existing on, at least one side of a front side surface and a rear side surface of the information medium, with an image sensor, and outputting an analog image signal;

selecting one of the magnetic datum read out with the magnetic head, and the image datum read out with the image sensor, by an analog switch unit according to a mode signal, and outputting the selected one;

converting an analog signal to a digital signal, while using a voltage according to a black reference voltage at the time of image reading, as a bottom voltage, within a predetermined converted voltage range;

making a level adjustment by way of adding a bias voltage, corresponding to a center value of the predetermined converted voltage range, with respect to a voltage level of the analog magnetic signal; and creating a timing signal including a clock for a process appropriate to the image datum or the magnetic datum, according to the mode signal; and controlling operations of at least the selecting one of the magnetic datum and the image datum, the converting an analog signal to a digital signal, and the making a level adjustment, in accordance with the created timing signal;

wherein, with respect to the analog magnetic signal for which the level adjustment has been made, an A/D conversion is carried out for converting an analog signal to a digital signal in the converting an analog signal to a digital signal.

* * * * *